Jan. 21, 1941.    C. A. NERACHER ET AL    2,229,336
POWER TRANSMISSION
Filed Jan. 21, 1938    8 Sheets-Sheet 1
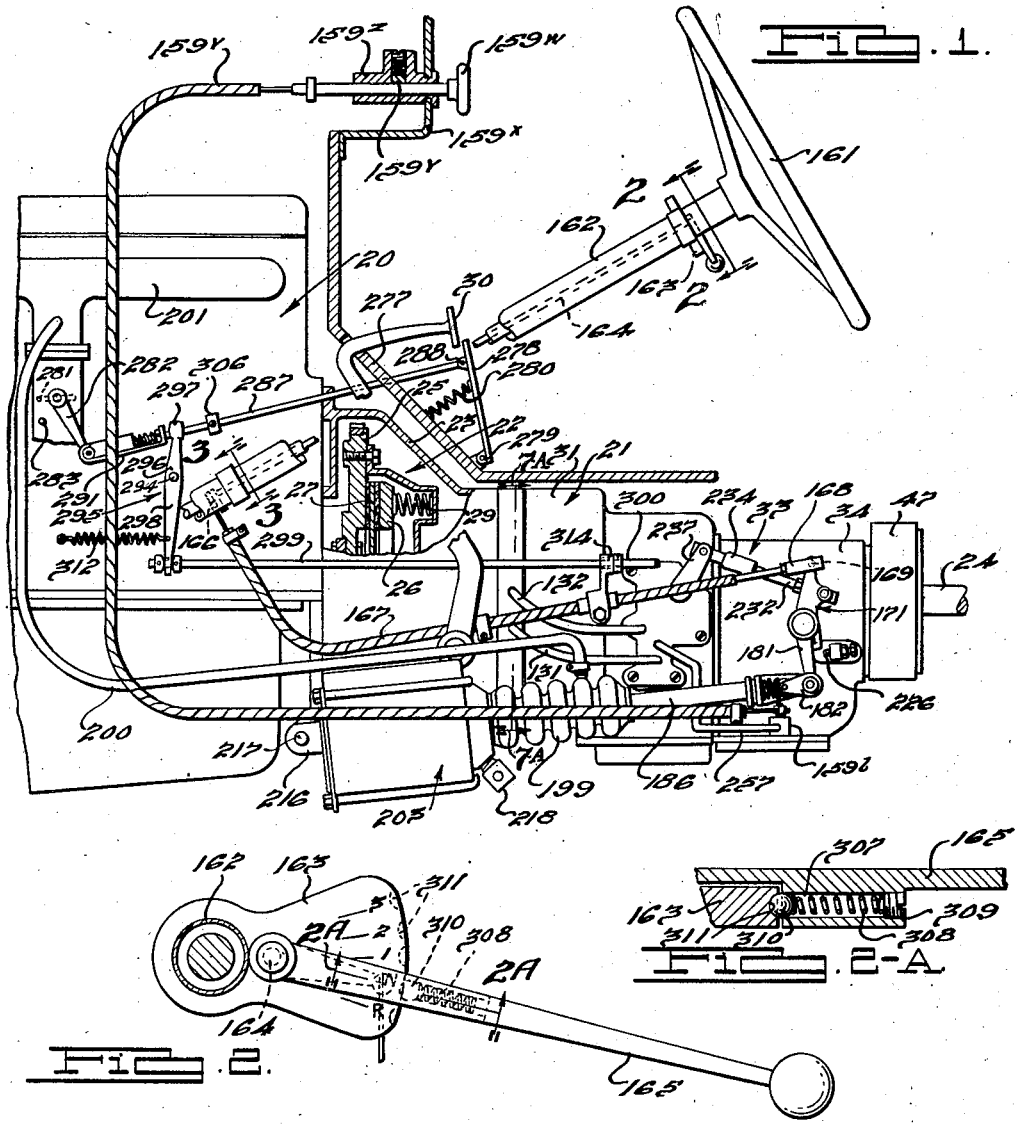
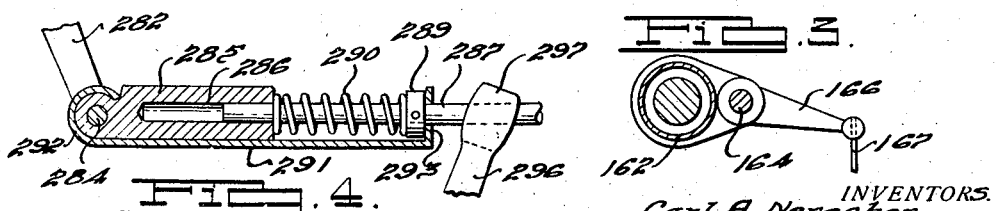
INVENTORS.
Carl A. Neracher,
William T. Dunn,
Augustin J. Syrovy,
Teno Iavelli.
BY
ATTORNEYS.

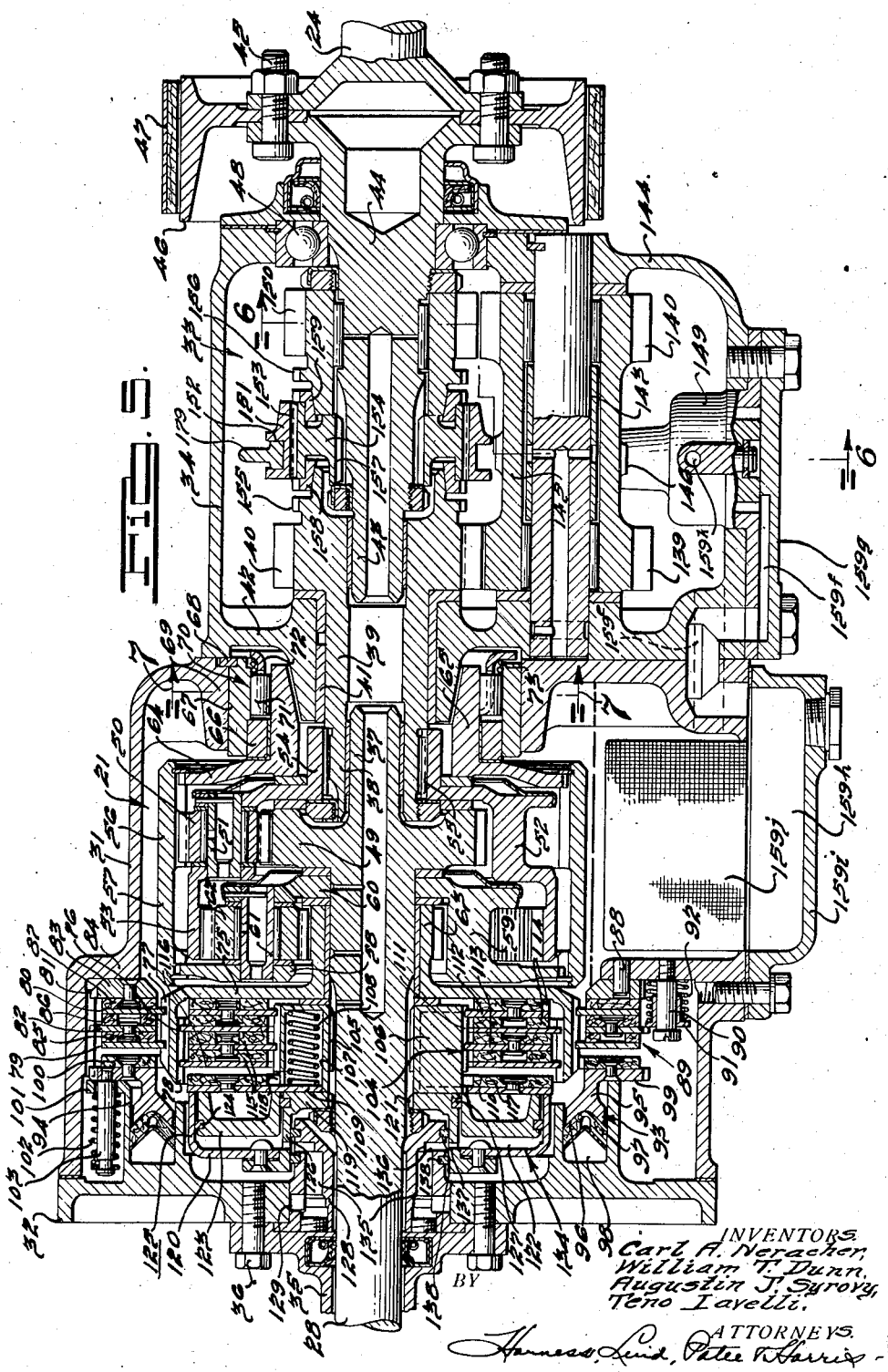

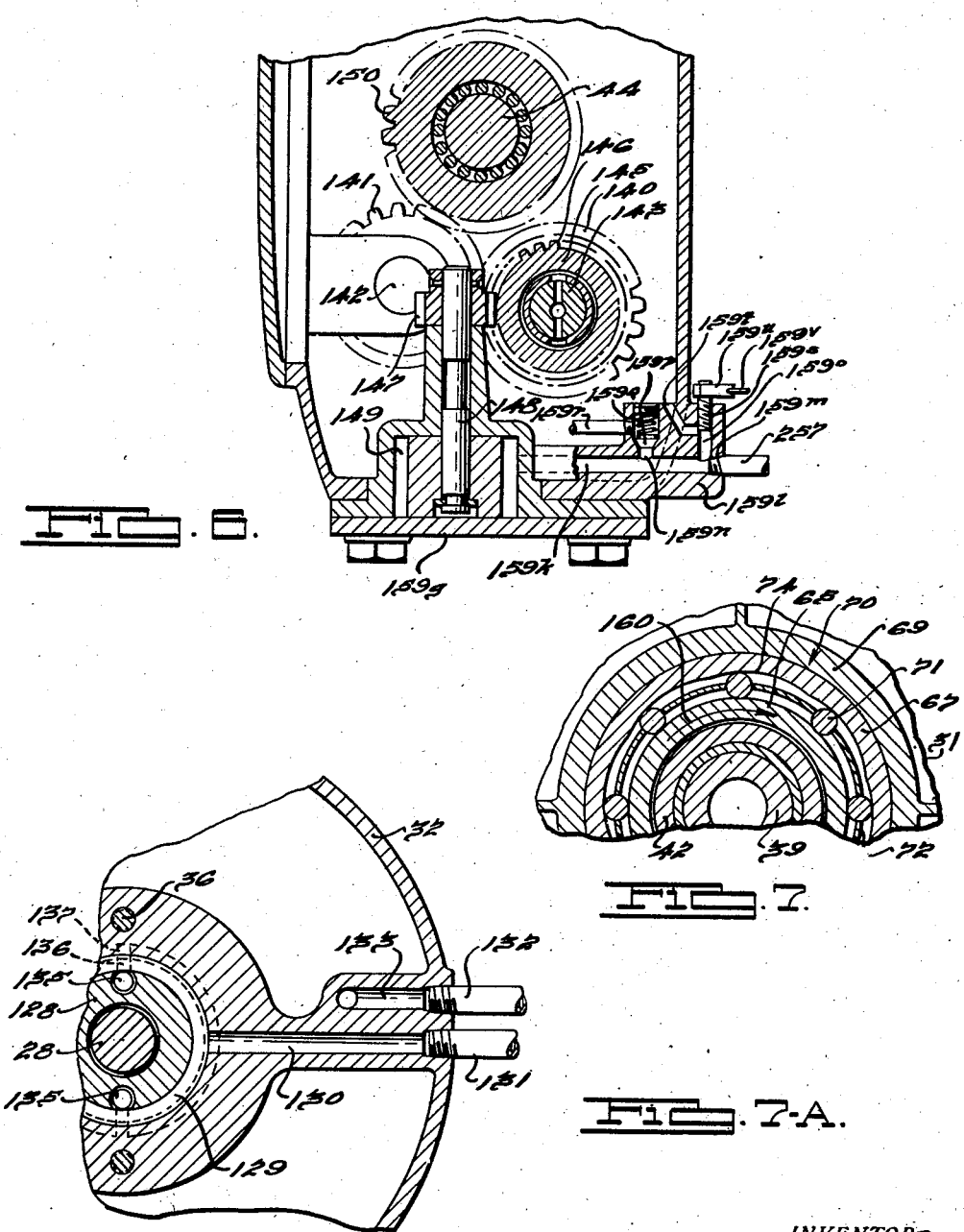

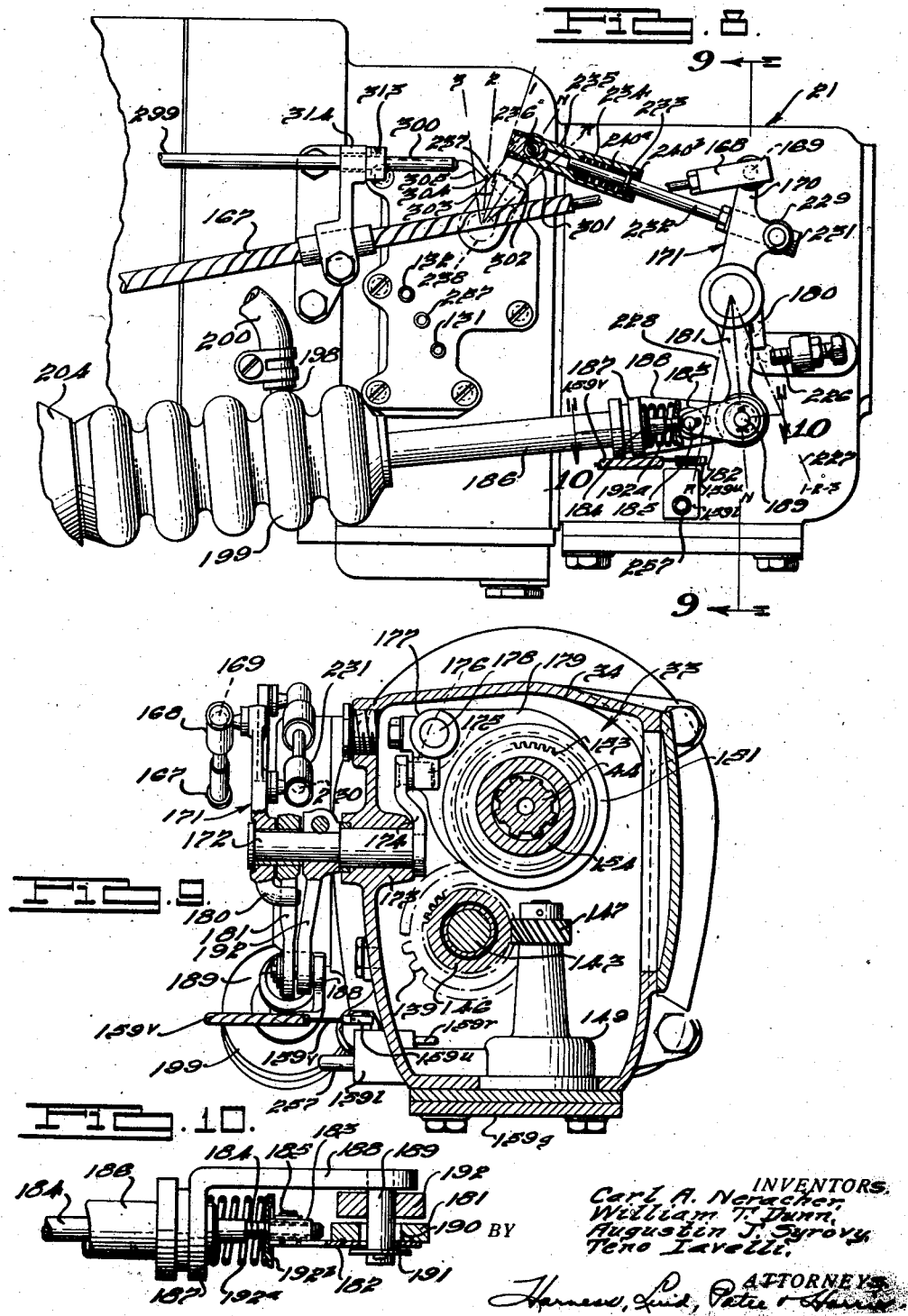

Jan. 21, 1941.　　C. A. NERACHER ET AL　　2,229,336
POWER TRANSMISSION
Filed Jan. 21, 1938　　8 Sheets-Sheet 5
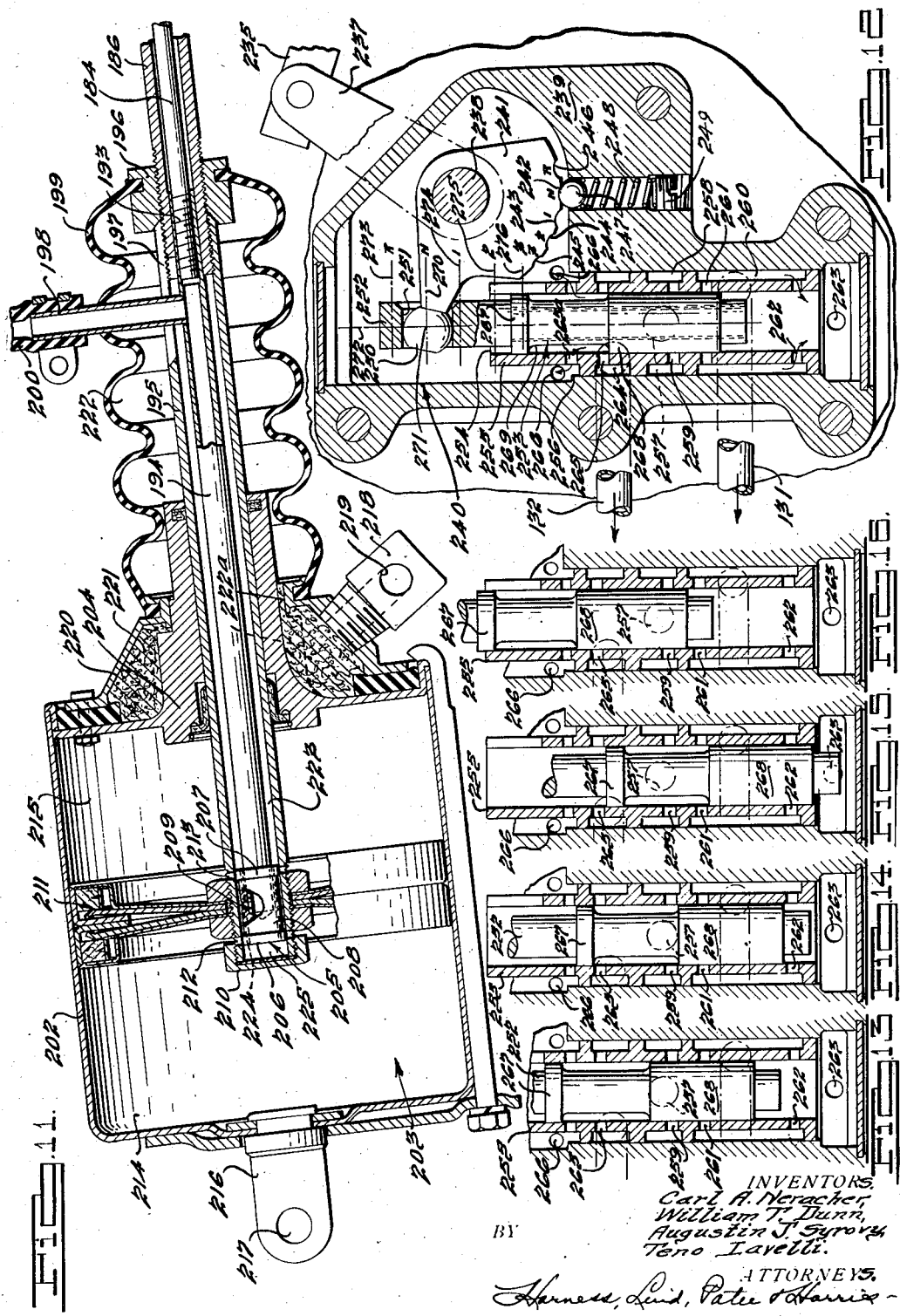
INVENTORS.
Carl A. Neracher,
William T. Dunn,
Augustin J. Syrovy,
Teno Iavelli.
BY
ATTORNEYS.

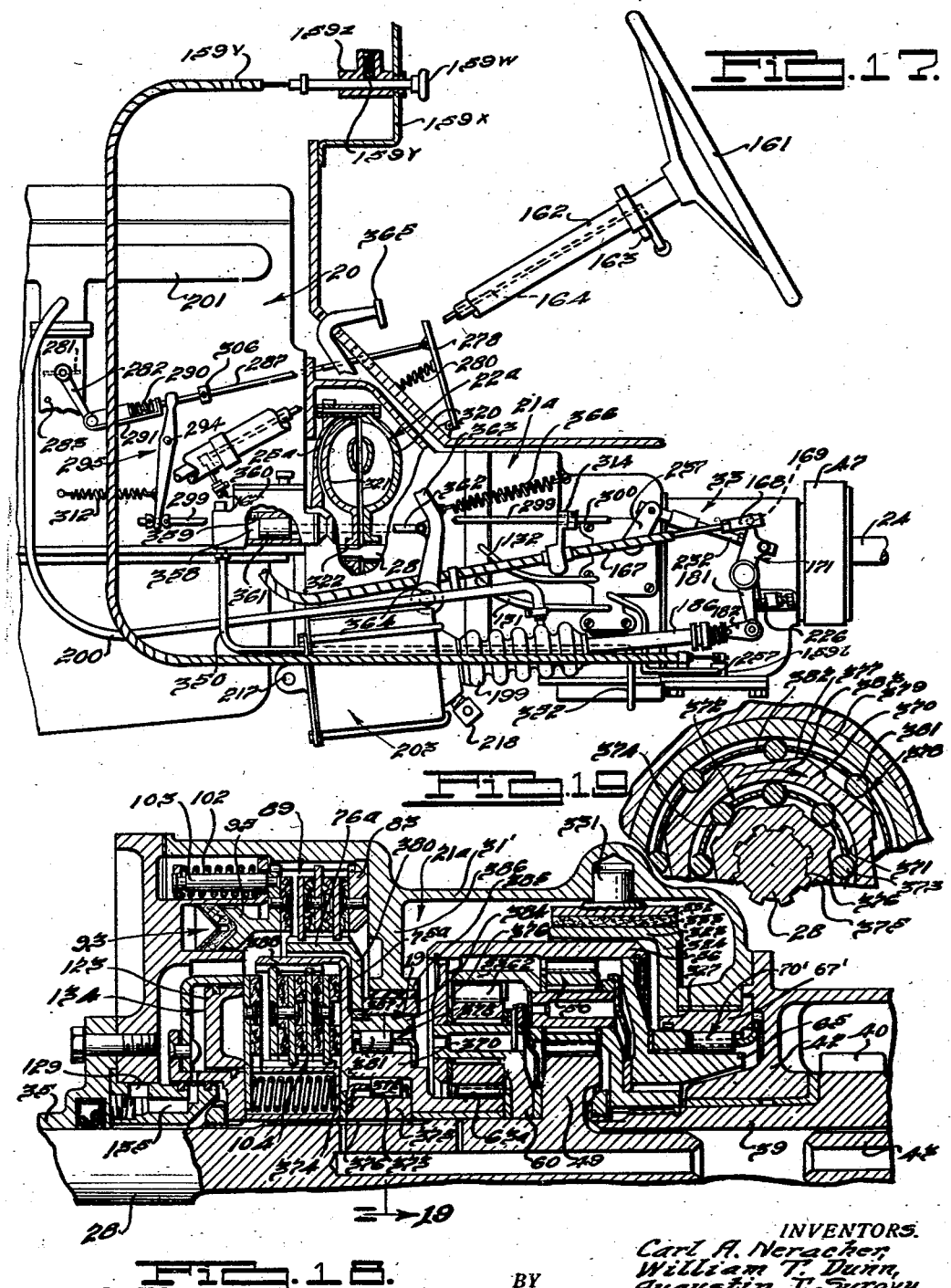

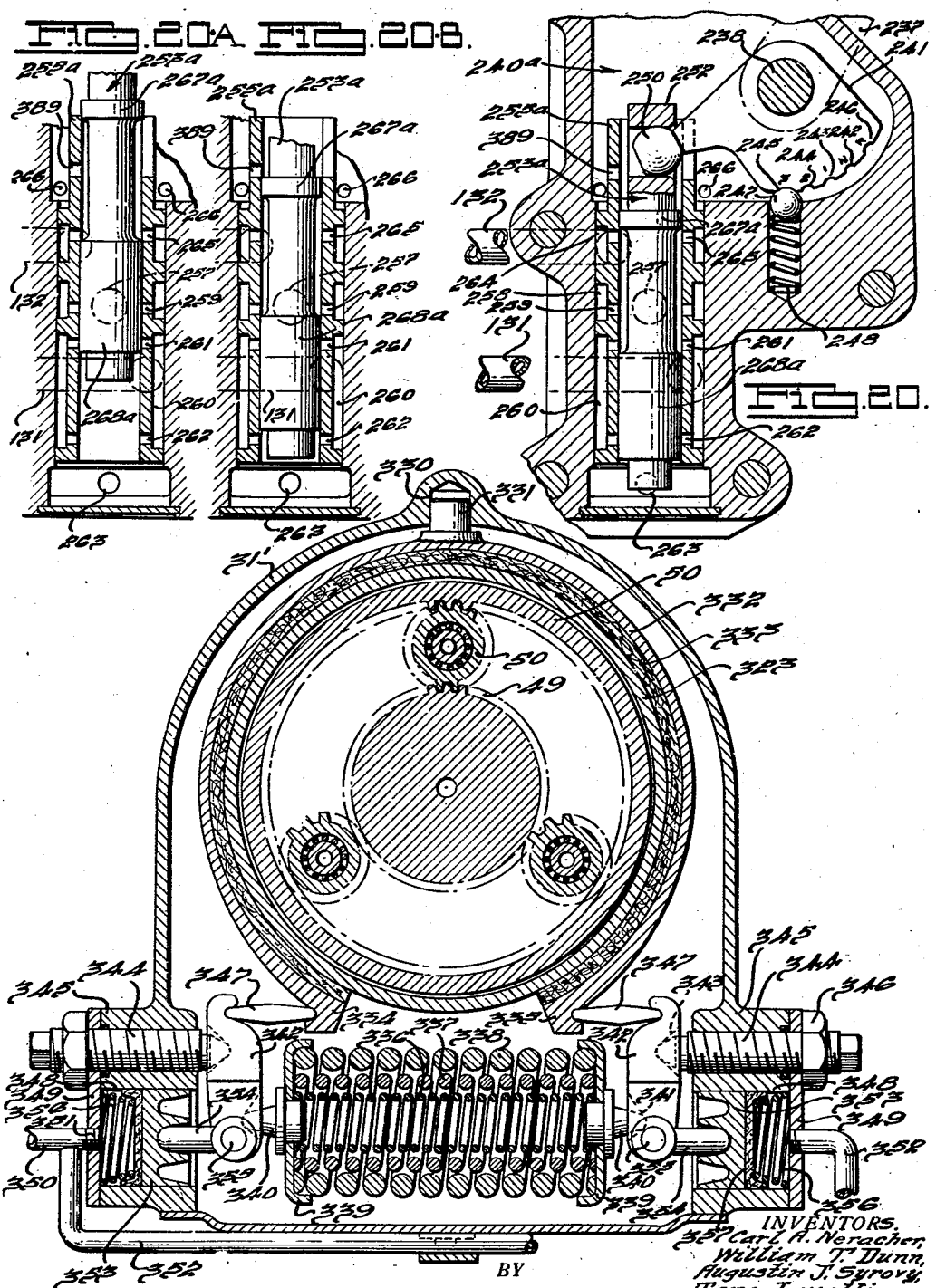

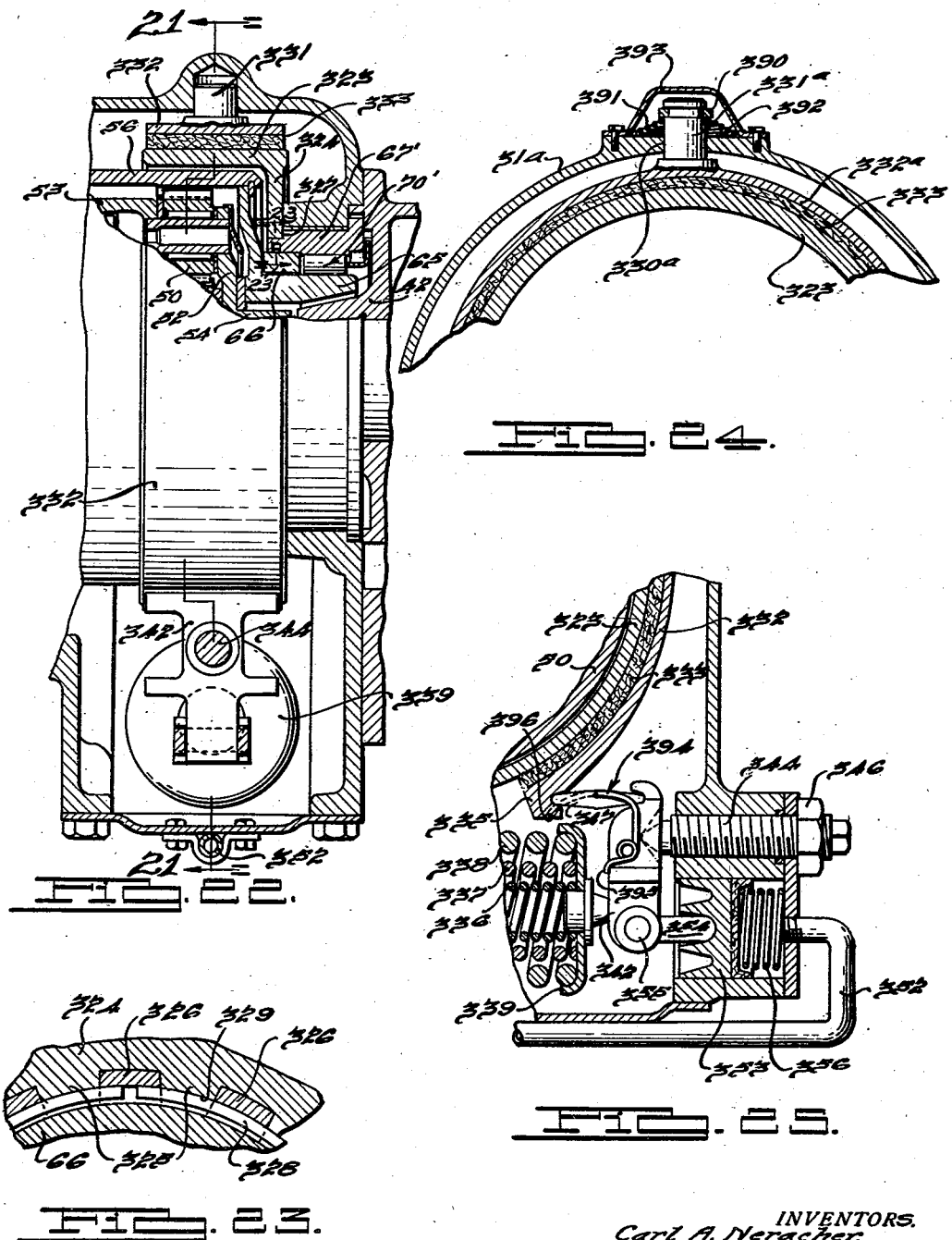

Patented Jan. 21, 1941

2,229,336

UNITED STATES PATENT OFFICE 2,229,336

POWER TRANSMISSION

Carl A. Neracher, William T. Dunn, Augustin J. Syrovy, and Teno Iavelli, Detroit, Mich., assignors to Chrysler Corporation, Highland Park, Mich., a corporation of Delaware Application January 21, 1938, Serial No. 186,145

67 Claims. (Cl. 74—472)

This invention relates to power transmissions and controls therefor especially adapted for driving motor vehicles.

Our invention is primarily directed to improvements in transmission systems employing planetary gearing although many of the novel features of our invention are not necessarily limited to transmissions of the planetary gear type.

Among the objects of our invention are the following: the provision of a transmission affording improved simplification, long life, ease of manipulation, and smoothness of operation for the various speed ratio changes; the provision of a transmission in which the speed changes up or down are effected with improved rapidity and freedom from shock on the transmission parts and lurching of the vehicle; the provision of a transmission incorporating a novel system of overrunning devices cooperating with the various elements in the transmission to provide improved and simplified gearing arrangements and controls therefor; the provision of a transmission wherein many of the speed ratio changes are effected by automatic synchronization of the driving and driven parts; and the provision of a transmission control system affording automatic changes in the drives in an improved and simplified manner.

Another object of our invention is to provide a transmission, preferably of the planetary gear type, wherein the forward and reverse drives are obtained by a primary control system embodying power operating means controlled by driver operation of a selector element; also the provision of a secondary control system for changing the transmission drive independently of the selector element of the primary system.

The secondary control system preferably is in the form of an accelerator pedal "kick-down" control for obtaining a step-down in the transmission from its fastest speed ratio drive to a slower driving speed ratio.

By incorporating a novel system of pressure fluid generation and delivery for the gear trains of the transmission and by providing a starting speed ratio drive independent of the pressure fluid, we have provided for a vehicle drive giving progressively faster speed ratios without requiring corresponding manipulation of the selector lever of the primary system. Thus, with the selector lever set for the fastest drive, the starting speed ratio initially accelerates the vehicle and as the pressure fluid builds-up in response to vehicle drive, the transmission automatically changes its speed ratio to the setting of the secondary kick-down control which, upon release of the accelerator pedal or other operator thereof, causes the transmission to further change its speed ratio drive to the setting of the primary selector element. The primary control system is preferably so arranged that it is capable of selectively controlling the various transmission drives independently of the secondary control system so that continued drive in any desired speed ratio setting may be had at will.

A further object of our invention is to provide an improved power transmission incorporating a fluid coupling drive between the engine and speed ratio changing transmission wherein means is provided to release the drive through the transmission by reason of the drag effect of the fluid coupling. The drive releasing means is preferably incorporated with a novel gear train system employing a reaction controlling device such that the gear train reaction may be taken or released under control of the drive releasing means.

Further objects and advantages of our invention reside in the novel combination and arrangement of parts more particularly referred to in detail hereinafter, reference being made to the accompanying drawings in which:

Fig. 1 is a side elevational view of our power transmission system somewhat diagrammatically illustrated.

Fig. 2 is a sectional plan view taken as indicated by line 2—2 of Fig. 1.

Fig. 2A is a fragmentary sectional elevational view taken as indicated by line 2A—2A of Fig. 2.

Fig. 3 is a sectional plan view taken as indicated by line 3—3 of Fig. 1.

Fig. 4 is a detail sectional elevational view of a portion of the engine throttle valve control means of Fig. 1.

Fig. 5 is a sectional elevational view through the transmission illustrating the driving gear trains.

Fig. 6 is a sectional view illustrating the pressure fluid pump and taken as indicated by line 6—6 of Fig. 5.

Fig. 7 is a sectional elevational view taken as indicated by line 7—7 of Fig. 5.

Fig. 7A is a sectional elevational view taken as indicated by line 7A—7A of Fig. 1 illustrating the pressure fluid inlet conduits for the transmission.

Fig. 8 is an enlarged side elevational view of a portion of the transmission control system as shown in Fig. 1.

Fig. 9 is a transverse sectional elevational view taken as indicated by line 9—9 of Fig. 8.

Fig. 10 is a detail sectional plan view taken as indicated by line 10—10 of Fig. 8.

Fig. 11 is an enlarged sectional elevational view of the vacuum operated motor as shown in Fig. 1.

Fig. 12 is a sectional elevational view through the pressure fluid distributor valve shown in its neutral position.

Figs. 13 to 16 are views of the distributor valve of Fig. 12 respectively shown in its positions corresponding to transmission settings for low, second, third and reverse.

Fig. 17 is a view generally similar to Fig. 1 but illustrating a somewhat modified transmission system embodying a fluid coupling and a drive releasing means for use in conjunction therewith.

Fig. 18 is a half-sectional elevational view of a transmission generally similar to the Fig. 5 transmission but having certain modifications thereover and adapted for use with the Fig. 17 transmission control system.

Fig. 19 is a sectional elevational view taken as indicated by line 19—19 of Fig. 18.

Fig. 20 is a sectional elevational view of a distributor valve generally similar to the Fig. 12 distributor valve but modified thereof for use with the Fig. 18 transmission arrangement, the valve being shown in its third speed position.

Figs. 20A and 20B are views of the Fig. 20 distributor valve but showing the valve respectively in positions corresponding to transmission settings for neutral and second.

Fig. 21 is a sectional elevational view taken as indicated by line 21—21 of Fig. 22 illustrating the releasable drive control means for the low or starting transmission drive.

Fig. 22 is a longitudinal sectional elevational view, partly in side elevation, showing the releasable drive control means for the low or starting transmission drive and adapted for use with either the Fig. 5 transmission or the Fig. 18 transmission, preferably the latter by reason of its incorporating a fluid coupling drive.

Fig. 23 is a fragmentary sectional elevational view taken as indicated by line 23—23 of Fig. 22.

Fig. 24 is a modified showing of a portion of the releasing means of Fig. 21.

Fig. 25 is a further modified showing of a portion of the releasing means of Fig. 21.

Referring to the drawings, reference character 20 represents the motor vehicle prime mover such as the usual internal combustion engine driving to the transmission 21 through a suitable main clutch 22 in housing 23, a power take-off or driven tail-shaft 24 transmitting the drive from the transmission to the driving ground wheels of the motor vehicle in the well known manner.

The main clutch 22 may be of the usual friction plate type of commercial design in which engine flywheel 25 drives the pressure plate 26, a friction disk 27 receiving the drive and thereby driving shaft 28 which is the drive shaft for transmission 21. The usual springs 29 load pressure plate 26 toward flywheel 25 to engage the clutch, a foot pedal 30 being controlled by the operator to release the clutch in the customary manner.

The transmission 21 comprises, in the present embodiment of our invention, forwardly driving planetary gear trains and a countershaft type forward and reverse unit receiving the drive from the planetary trains. Thus the planetary gearing is contained within a main casing 31 to which is attached a front cover 32, the forward and reverse drive mechanism 33 being housed in a casing 34 secured to the rear of casing 31.

The transmission drive shaft 28 has a forward journal 35 which is secured at 36 to cover 32, the rear end of shaft 28 being piloted at 37 in the forward end 38 of an intermediate hollow driven shaft 39 formed with a driving pinion 40. The shaft 39 is journalled at 41 in the transverse wall 42 of casing 34 and journals the piloting forward end 43 of driven shaft or tailshaft 44, the latter being secured to shaft 24 by fasteners 45 which also carry a propeller shaft brake drum 46 engageable by a friction brake 47 for use as a vehicle parking or emergency brake. Shaft 44 is journalled at 48 in the rear end of casing 34.

The planetary gearing comprises a primary driving sun gear 49 which may be formed integrally with shaft 28 for direct drive therefrom, this sun gear of the first planetary gear train meshing with a plurality of planet pinions 50 which are spaced around the sun gear, one being illustrated in Fig. 5. Each pinion 50 is journalled on a shaft 51 supported by the carrier structure 52 which has portions forming the forwardly projecting annulus or internal gear 53 and the rearwardly extending hub 54 which has a splined driving connection 55 with shaft portion 38.

Planet pinions 50 mesh with the annulus gear 56 which has a forwardly projecting cylindrical extension 57 having fixed thereto the inwardly projecting portion 58 of a second carrier structure 59, the latter having a rear inwardly extending portion 60 journalling the carrier structure on shaft 28. This carrier structure likewise has a plurality of shafts 61 each journalling a planet pinion 62 meshed with annulus gear 53 and a second sun gear 63 loosely journalled on shaft 28 to form the second planetary gear train.

Drivingly connected to the rear end of annulus gear 56 is an annular spider 64 formed with a rearwardly extending cylindrical hub 65 journalled at 66 to the cylinder 67 non-rotatably fixed at 68 within the cylindrical portion 69 of casing 31. The cylindrical members 65 and 67 provide the inner and outer parts respectively of an overrunning control or brake device 70. A plurality of frictionally wedged cylinders or rollers 71 are disposed between the cylindrical members, the rollers being spaced by a cage 72 yieldingly urged by spring 73 in a counter-clockwise direction, as seen in Fig. 7, toward the wedging or clutching position of the rollers. One cylindrical member, as member 67 for example, has its roller engaging surface formed with a series of cam faces 74 so arranged that rollers 71 will freely accommodate clockwise rotation of hub 65 and annulus gear 56 but immediately wedging the rollers when hub 65 tends to rotate counterclockwise thereby preventing such counterclockwise rotation. The reaction overrunning device 70 is a braking means for the annulus gear 56 since it holds this gear from rotating backwardly and automatically releases the gear for rotation forwardly.

The sun gear 63 is formed with a spider 75 having the annular drum 76 formed with axially extending external splines 77 and internal splines 78. The external splines 77 are slidably and drivingly engaged by a plurality of drive plates 79, 80. The casing 31 carries splines 81 engaged by a non-rotating but axially slideable plate 82 and a rear plate 83 which has its rearward sliding movement limited by the casing wall portion 84. The plate 82 carries annular friction mats 85 and 86 respectively engaging drive plates 79 and 80. Plate 80 is engaged by a rear mat 87 carried by plate 83. The wall portion 84 carries one or more pins 88 which cooperate with splines 81 in slidably centering and guiding the plate 83.

The frictionally engageable plates and mats between fixed splines 81 and rotatable splines 77 provide a frictional control on the sun gear 63 which may be termed a rotary control element of the planetary gearing for controlling speed ratio change in the transmission. More particularly, this friction control, which is generally designated at 89, is a braking device since it is adapted to hold sun gear 63 against rotation by connecting the same to the stationary casing 31.

The wall portion 84 carries a pin 90 slidably mounting a thimble 91 urged forwardly by a spring 92 whereby the thimble urges plate 82 forwardly to unpack or disengage the friction elements of the braking device 89. For packing the friction elements to engage this braking device we have provided fluid pressure operating means in the form of a motor 93. This motor comprises an annular cylinder 94 carried by the cover 32 and slidably receiving the annular piston 95 which is annularly grooved at 96 to receive the annular grooved packing 97 arranged to deflect radially into tight sealing fit with cylinder 94 when subjected to pressure fluid in the annular pressure chamber 98.

The piston 95 has an annular pressure flange 99 splined to slidably engage the fixed splines 81, a friction mat 100 being carried by the flange 99. The cover 32 has an abutment 101 limiting forward brake releasing movement of piston 95 and mat 100 under the influence of one or more springs 102 which act between abutment 101 and studs 103 which project forwardly from flange 99 for sliding through the abutment.

A further friction control is operably associated with sun gear 63 whereby the latter may be directly drivingly connected to the driving shaft 28 for a direct drive through the transmission 21. More particularly, this friction control, generally designated at 104, is a clutching device since it drivingly connects rotating parts.

Fixed to shaft 28 by splines 105 is the driving spring cage 106 formed with a plurality of forwardly opening cylinders 107 for coil springs 108 which yieldingly urge the finger portions 109 of pressure plate 110 forwardly to its clutch disengaging position. The periphery of cage 106 is formed with axially extending splines 111 slidably driving plates 112, 113 respectively carrying friction mats 114, 115 which drive the driven plates 116 engaging internal splines 78. The pressure plate 110 carries a mat 117 which is adapted to move rearwardly to pack the various mats and plates against the spider 75 to drive sun gear 63 from cage 106 and shaft 28. The pressure plate 110 is driven by cage 106 by the fingers 109 extending through cage slots 118 which accommodate axial movement of plate 110.

When clutch 104 is disengaged, as in Fig. 5, springs 108 move plate 110 against the hub 119 of the rotating annular cylinder structure 120, the hub having a splined drive connection at 121 with shaft 28. The annular cylinder structure 120 provides a pressure fluid chamber 122 forwardly of an annular piston 123 movable rearwardly in the cylinder to urge mat 117 into packing engagement with the various clutching elements of clutch 104. Piston 123 carries an expanding sealing ring 124 slidably engaging the outer wall 125 of cylinder 120 while the inner wall 126 of the cylinder carries a second ring 127 slidably engaging piston 123.

Clamped between journal member 35 and cover 32 is a fixed pressure fluid conductor member 128 having an annular pressure fluid inlet port 129 (see Figs. 5 and 8) which communicates with a radially disposed passage 130 adapted to receive pressure fluid from a direct or third speed supply pipe 131. A second pipe 132 is adapted to supply pressure fluid to the second speed motor 93 by reason of a radial passage 133 which opens inwardly to the pressure chamber 98.

The piston 123 and cylinder 120 constitute a third speed motor 134, pressure fluid from passage 130 entering port 129 for delivery forwardly through passages 135 and thence outwardly at 136 to inlet ports 137 for chamber 122. Bounding the outlets 136 are a pair of expanding sealing rings 138 engaging cylinder wall 126.

When the chamber 122 is vented, springs 108 acting on plate 110 move piston 123 forwardly until plate 110 engages the cylinder portion 125 and the hub 119.

Referring to the forward and reverse drive mechanism 33, the driving pinion 40 meshes with countershaft cluster gear 139, a second gear 140 meshing with reverse idler gear 141 (see Fig. 6) mounted on a countershaft 142. The cluster gears 139, 140 are mounted on a countershaft 143 supported in wall 42 and the rear wall 144 of casing 34. The cluster gear shaft 145 has a gear 146 meshing with gear 147 fixed to shaft 148 for driving any suitable type of pump, such as a gear pump 149 adapted to deliver pressure fluid, such as oil, selectively to motors 93 and 134.

Idler gear 141 has constant mesh with a gear 150 loose on driven shaft 44. A shiftable clutch sleeve 151 is provided with a yoke-receiving shift groove 152 and has clutch teeth 153 splined to a hub 154 and selectively engageable with clutch teeth 155, 156 respectively carried with gears 40 and 150. Hub 154 has splined connection at 157 with shaft 44. Associated with sleeve 151 is a synchromesh mechanism herein diagrammatically illustrated but more fully disclosed in the copending application of Otto E. Fishburn, Serial No. 180,840, filed December 20, 1937, which is a continuation of Serial No. 108,123, filed October 29, 1936. While other forms of synchronizers may be used, or none at all, we preferably employ the aforesaid type including the servo friction clutching elements 158, 159 which frictionally synchronize gears 40 and 150 respectively with shaft 44 and prevent positive clutching of teeth 153 with either of the clutch teeth 155 or 156 until synchronization has been brought about.

The pump 149 draws fluid, such as oil from a suitable reservoir in transmission casing 31 or 34. In Fig. 5 these casings are open to each other at 159$^e$ so that oil may flow between them, the pump having intake conduit 159$^f$, in the bottom cover 159$^g$, communicating with the well 159$^h$ in the bottom cover 159$^i$ of the casing 31. This well has a screen 159$^j$ through which oil is strained for passage to the pump 149. As best shown in Fig. 6, the pump delivers oil pressure through an outlet 159$^k$ in boss 159$^l$ which leads to delivery at 159$^m$ for distribution to motors 93 and 134. Between the pump and delivery 159$^m$ there are two upwardly extending passages 159$^n$ and 159$^o$.

Passage 159$^n$ opens to a disc valve 159$^p$ loaded by spring 159$^q$ sufficient to build up the desired pressure at delivery 159$^m$, excess pressure unseating valve 159$^p$ and escaping through outlet 159$^r$ which preferably is distributed to the various gears and bearings in the transmission for lubrication purposes.

The passage 159° has to do with the build up of the pressure fluid by the pump after the vehicle has been brought to rest. Inasmuch as the pump 149 is drivingly connected with the gear 40 and the driven shaft 44 (with shifter 151 shifted either forwardly or rearwardly), the pump will lose its pressure when the vehicle stops and likewise the pressure will fall beyond the delivery 159m as will presently be more apparent. When the vehicle stops then shaft 44 is also at rest, the engine being permitted to operate at its idling speed by release of the main clutch 22, the shifter 151 being preferably left in its shifted position for a temporary stop. A back leakage flow through most pumps will take place and especially through a gear-type pump so that if desired the passage 159° may in many instances be omitted. However, where the back flow is not as fast as desired, or where it is desired to vary the pump pressure build-up characteristics, for reasons presently apparent, the passage 159° is provided for a metered escaping flow or to restricted vent for the outlet 159k. To this end an adjustable valve 159s is threaded in the upper end of passage 159° to vary the outlet from this passage to an escape 159t opening to the bottom of casing 34. The oil collecting in casing 34 passes to casing 31 by the aforesaid passages 159e.

We preferably provide a remote control for varying valve 159s so that the pump pressure build-up and the functioning of the transmission may be varied by the driver while operating the vehicle.

Secured to the upper end of valve 159s is a lever 159u operated by a Bowden wire 159v leading to a push-pull hand control 159w at dash 159x. A spring loaded friction shoe 159y is carried by the guide bracket 159z so that the control 159w will stay in any position of adjustment. The threads of valve 159s are of such pitch and the parts are otherwise so arranged that for the range of movement of control 159w, the valve 159s may be positioned to entirely close or open the escape 159t.

As thus far described the speed ratio drives, apart from the controlling means which will hereinafter be described, functions as follows. The transmission is illustrated in its neutral setting and to drive forwardly in the low or first speed ratio setting, the main clutch 22 is released and sleeve 151 shifted forwardly to clutch gear 40 and shaft 39 with driven shaft 44. The sleeve 151 is left in its forwardly shifted position for all forward vehicle drives. The main clutch 22 is now engaged causing the engine to drive shaft 28 and sun gear 49 independently of pressure fluid from pump 149. At this time brake 89 and clutch 104 are released, for a low speed setting, so that the sun gear 63 is free. Since carrier 52 is connected to shaft 39 and thereby loaded, the forwardly driving sun gear 49, driving clockwise when looking front to rear, acts through planet pinions 50 and tends to drive annulus gear 56 backwards which however is prevented by a locking of overrunning device 70. Therefore the annulus becomes fixed and carrier 52 drives shaft 39 at a forward relatively low speed reduction ratio.

This low speed provides for a condition of free-wheeling of the vehicle in the low speed ratio, this being of advantage in providing speed ratio changes free from objectionable shock or jolt to the vehicle passengers or transmission parts. Thus, a change may be made from second or high down to low, by releasing the brake 89 or clutch 104 as the case may be, without any jolt because the vehicle will coast until the engine is speeded up sufficiently to pick up the drive from shaft 28 to shaft 39 through the low speed gear ratio by locking overrunning device 70 as aforesaid. Even with a dead engine the vehicle will free-wheel in low viz., merely with shifter 151 clutched with teeth 155. The vehicle may be towed to start the engine in second or direct speed settings by building up pressure at pump 149 which is driven by the drive shaft 44 and gear 40 with shifter 151 clutched forwardly and selector lever 165 set at "2" or "3." For this towing condition the valve 159s is preferably positioned to close vent 159t to facilitate building up the pressure under such slow running conditions.

To drive in the intermediate or second speed ratio setting, pressure fluid is introduced to the second speed supply pipe 132 for passage to chamber 98 to actuate the second speed motor 93. This operation causes piston 95 to smoothly engage the braking device 89 for holding sun gear 63 against rotation. This results in a reduction forward drive faster than the low speed ratio by compounding the second speed planetary gear train through the low speed train. Thus sun gear 49 drives pinions 50 but since sun gear 63 is fixed, annulus gear 56 now revolves forwardly at a relatively slow speed, such forward rotation being permitted by overrunning device 70. The arrow 160 in Fig. 7 represents forward rotation of hub 65.

In this second speed drive there is no free-wheeling of the vehicle because sun gear 63 being held, the vehicle will drive the engine through the compounded planetary trains. A down selection may be made from third to second without releasing the main clutch 21.

For the third speed ratio drive which is a direct or 1 to 1 drive, the second speed brake 89 is released by venting the pressure fluid at motor 93 and pressure fluid is introduced to chamber 122 through pipe 131 and the communicating passages 130, 129, 135, 136 and 137. Motor 134 then operates to engage clutch 104 to effect a direct drive from shaft 28 to sun gear 63. The two planetary gear trains are thereby locked so that all the elements thereof rotate as a unit and shaft 28 drives shaft 39 for a direct forward drive. This drive causes forward rotation of hub 65 which maintains rollers 71 of overrunning device 70 free from wedging. This direct drive does not embody free-wheeling of the vehicle since the vehicle may drive the engine through the locked gear trains.

For driving the vehicle in reverse, the sleeve 151 is shifted rearwardly to clutch with teeth 156 of gear 150. Shaft 39 then drives through gears 40, 139, 140, 141 and 150 for driving shaft 44 in reverse or backwardly with respect to the forward rotation of shaft 28. The reverse drive is effected merely by shifting sleeve 151 rearwardly because the transmission 21 will always provide the low speed ratio drive from shaft 28 to shaft 39 by reason of the automatic braking of annulus gear 56 by the reaction overrunning device 70.

A variety of controlling means may be arranged to control pressure fluid supply to motors 93 and 134 and to shift sleeve 151. In the present embodiment of our invention we have arranged a system of valving means for selectively distributing the pressure fluid from pump 149 to the motors, the valving means in this instance and also the shift sleeve 151 being controlled selectively by the motor vehicle operator or driver. We have also provided a power operating system controlled by manipulative adjustment of a single control element, such as a selector lever, for effecting shift of the sleeve 151 and for effecting selective operation of brake 89 and clutch 104; also a further manual control operable independently of the selector lever for effecting a drive through the transmission faster than that set by the selector lever. This further manual control is preferably in the form of a "kick-down" device operable in response to a depression of the usual accelerator pedal through an over-travel or beyond its wide open throttle adjusting position.

The driver operated controls are arranged for convenient manipulation by the vehicle driver while operating the vehicle. The usual vehicle steering wheel 161 is mounted on the customary post 162 which carries a fixed plate 163 in the form of a sector projecting to the right of the post. Extending parallel along post 162 and adjacent thereto is a rotatable shaft 164 which projects upwardly through sector 163, this shaft having fixed thereto the laterally extending selector lever or element 165 readily grasped by the driver. This selector lever is movable about the axis of shaft 164 to which it is connected so that the shaft is rotated about its axis.

Lever 165 is illustrated in its neutral position, sector 161 bearing indicia "1," "2," "3," "N" and "R" to indicate predetermined stations of shift for the lever 165 in controlling sleeve 151 and in setting the transmission to drive in first or low, second or intermediate, third or direct, and reverse.

In order to shift the sleeve 151 by power in response to movement of lever 165, and to control operation of motors 89 and 134, the shaft 164 has a lever 166 (Fig. 3) fixed to its lower end. This lever is connected to Bowden wire mechanism 167 which has its other end connected to an operator or connector 168 which has swivel connection with the ball end 169 of arm 170 of a lever 171. Lever 171 is loosely journalled on a shaft 172 which is rotatably supported in a boss 173 of the casing 34. Secured to the inner end of shaft 172 is a lever 174 having an inwardly extending pin 175 fitting in an opening 176 of the member 177 slidable longitudinally of the mechanism 33 on a support rail 178. The member 177 has a yoke portion 179 fitting the groove 152 of shift sleeve 151 so that rocking motion of shaft 172 will cause sleeve 151 to clutch with teeth 155 for a forward drive or with teeth 156 for a reverse drive.

The lower end of lever 171 is provided with an inwardly bent finger 180 which, with lever 171 in its neutral position viz., its position corresponding to the neutral setting of selector lever 165, contacts against the rear face of a lever 181 which is likewise loose on shaft 172. Welded to the lower end of lever 181 is a forwardly projecting plate 182 and welded to the forward end of this plate is a head 183 having a bore longitudinally therethrough to adjustably receive the rear end of a rod 184, any suitable fastener 185 locking rod 184 to head 183.

The rod 184 extends forwardly within a tube 186 so that relative movement axially between the tube and rod may take place. The rear end of tube 186 has fixed thereto a head 187 provided with a bracket 188 which mounts a pin 189, this pin extending through an opening 190 in lever 181 and plate 182 with lost-motion clearance 191 accommodating limited swing of lever 181 in opposite directions relative to pin 189. Clamped to shaft 172 is a third lever 192 the lower end of which is disposed between bracket 188 and lever 181 and through which the pin 189 passes without lost-motion clearance. A spring 192ᵃ is seated on head 187 and thrusts rearwardly on head 183 and rod 184 by reason of the spring seat 192ᵇ which surrounds this rod and engages head 183.

The forward end of rod 184 is fixed by threads 193 to a tubular valving extension 194 slidably supported in the forward end portion of tube 186. Fixed to tube 186 is a hollow piston rod 195 provided with a head 196 threadedly engaging tube 186, this piston rod having a slotted guideway 197 through which a pipe 198 extends so that pipe 198 may slide longitudinally in guideway 197. The inner end of pipe 198 is fixed with valving tube 194 and communicates therewith, the outer end of pipe 198 passing through a bellows-like rubber boot 199 for connection with a flexible hose 200 adapted to communicate with a suitable source of pressure fluid supply. In the present illustration this hose is open to the intake manifold 201 of engine 20 since it is convenient to utilize the partial vacuum readily available at this source.

The piston rod 195 enters the cylinder 202 of the motor 203 and is slidably guided by the head 204 of the cylinder. The boot 199 protects the parts therewithin from dirt entering the motor and other parts and yet accommodates relative sliding movement between piston rod 195, valving tube 194, and the cylinder 202.

Secured to the forward end of valving tube 194 is a valve member 205 formed with cylindrical heads 206, 207 and an intermediate annular recess 208 which is always open to valving tube 194 by the passages at 209. The forward end of piston rod 195 is closed by a cap 210. Secured to the piston rod is a piston assembly 211 slidable within cylinder 202, the piston rod having ports 212, 213 just forwardly and rearwardly of piston 211. Normally these ports are respectively closed by valve heads 206 and 207 but slight movement of valve 205 fore or aft will respectively open recess 208 and pipe 198 with port 212 and cylinder chamber 214 or with port 213 and cylinder chamber 215. The motor 203 is mounted by a cylinder bracket 216 suitably swivelly supported at 217 to a convenient support.

If desired, in order to facilitate movement of piston 211 by vacuum alternately opened to chambers 214 and 215, the cylinder 202 has suitable means to relieve a vacuum tendency in whichever chamber is not open to the supply pipe 198. This air bleed means comprises a plug 218 having an air intake 219 open to a cover chamber 220 packed with air cleaning material 221 ordinarily used in carburetor air cleaners. The chamber 220 is open to the space 222 within boot 199 by means of a slot 222ᵃ formed in cover 204. The space 222, in turn, is open through slot 197 to the space 223 between piston rod 195 and valving tube 194. The valve 205 has a series of small longitudinally extending holes 224 which open space 223 to the chamber 225 between plug 210 and the front end of valve 205. The holes 224 are formed circumferentially between passages 209 so as not to communicate therewith. The operation of the air bleed means will presently be described.

In the operation of the power shifting means for clutch sleeve 151, as thus far described, let it be assumed that the driver shifts selector lever 165 from the neutral station "N" to the low speed station "1". This movement causes lever 166 to pull through Bowden wire 167 to swing lever 171 counterclockwise (Fig. 8) to swing finger 180 away from lever 181. Lever 181 is then free so that the relatively light spring 192a moves rod 184 rearwardly in taking up clearance 191 and in moving valve 205 so that head 207 opens chamber 215 to vacuum supply hose 200 and so that head 206 opens chamber 214 to the air supply 219.

Thus head 207 uncovers ports 213 which opens chamber 215 to valve recess 208 which communicates through passages 209 thence through tube 194 and pipe 198 to hose 200 and intake manifold 201. Vacuum is then introduced into chamber 215 and piston 211 moves rearwardly until port 213 is again closed by head 207. Valve 207 is thus a leader valve and piston 211 is a follower, the piston taking whatever position of movement which is imparted to the valve. Rearward movement of valve 205 causes head 206 to open ports 212 so that space 214 opens to chamber 215 thence through holes 224, chamber 223, slot 197 to boot chamber 222 which opens through slot 222a to air inlet 219 whereby the chamber 214 is vented to facilitate rearward movement of piston 211.

Spring 192a by rearwardly moving leader valve 205 thus causes follower piston 211 to move rearwardly with the valve until lever 181 strikes an adjustable stop 226, the finger 180 for the low speed setting just accommodating this movement of lever 181. Spring 192a cannot move lever 181 prior to adjustment of selector lever 165 because, at some suitable point or points in the selector system, the lever 181 is held by suitable detent means in any position of its adjustment, this detent means being illustrated in connection with the selector lever 165 in Fig. 2A presently to be described. Lever 181 has its center line at 227 (Fig. 8) when engaged with stop 226, further movement of lever 171 counterclockwise by shift of selector lever 165 to station "2" for second speed or station "3" for third speed merely swinging finger 180 away from lever 181 which then stays in the position 227 against stop 226.

When piston 211 is moved rearwardly, in the foregoing illustration of shifting selector lever 165 from "N" to "1," piston rod 195 moves tube 186 and head 187 to operate bracket 188 and pin 189 rearwardly thereby swinging lever 192 counterclockwise (Fig. 8) to act through lever 174 and yoke 179 to shift sleeve 151 forwardly to clutch the hub 154 and driven shaft 44 with the teeth 155 for a forward drive through the low speed first planetary gear train as aforesaid. The sleeve 151 remains clutched with teeth 155 when selector lever 165 is shifted to "2" or "3," such shifting having no effect on motor 203 because lever 181 is held at stop 226. Of course, the driver may shift lever 165 directly from "N" to "2" or "3" but in such event lever 181 moves to stop 226 and motor 203 operates sleeve 151 forwardly just as for the shift from "N" to "1."

When it is desired to drive the vehicle in reverse, the driver moves selector lever 165 from "N" to "R" which then swings lever 171 clockwise (Fig. 8) whereby finger 180 swings lever 181 to the center line position 228. Thus the rod 184 is moved forwardly to cause head 206 to uncover ports 212 to supply vacuum from the manifold 201 to chamber 214 whereby a corresponding forward movement of piston 211 takes place. When rod 184 is thus moved, head 207 uncovers ports 213 so that chamber 215 is opened to chamber 223 whereby air is supplied from inlet 219 to chamber 215 through the aforesaid air bleed system.

Forward movement of piston 211 moves lever 192 clockwise to shift sleeve 151 rearwardly to clutch with teeth 156 to establish the aforesaid reverse drive through the low speed planetary gearing and the countershaft reverse gear set 46, 139, 140, 141 and 150. With the system arranged as illustrated reverse drive is obtained only in the one speed ratio aforesaid since motors 98 and 134 are released with selector lever 165 set for reverse.

We will now describe our primary and secondary controls on the operation of the brake 89 and clutch 104 for effecting control in the second and third speed drives. The primary control is obtained by manual selection of lever 165 and the secondary control is obtained by an overtravel of the accelerator pedal beyond wide open throttle adjustment.

Lever 171 has a second arm portion 229 carrying a ball 230 for operating the connector 231 to which is secured a rod 232 carrying an abutment 233 slidable in the cylinder portion 234 of connector 235 which has ball connection at 236 with a lever 237 fixed to a rockshaft 238 which enters the casing 239 of the distributor valve means 240. A spring 240a is relatively stiff and normally provides a connection whereby movement of rod 232 forwardly is transmitted to connector 235 without lost motion. When rod 232 is pulled rearwardly by lever 170, abutment 233 positively moves connector 235 by a ring 240b fixed to the rear end of cylinder portion 234.

Secured to rockshaft 238 is a segment 241 having very shallow notches 242 to 246 respectively engaging detent ball 247 adjustably loaded by a very light pressure spring 248 and set screw 249 when selector lever 165 is set at stations "N," "1," "2," "3" and "R." The detent 247 may, in fact be omitted, because a corresponding but much stronger detent means may be provided at the selector lever 165. The detent means 247 assists in properly locating the segment 241.

Segment 241 has an operating ball lever portion 250 engaging an opening 251 in the upper end or stem 252 of the distributor valve 253 which slides in the bore 254 of a porting sleeve 255 which is fixed within the vertical bore 256 formed in the casing 239. The aforesaid outlet 159m from pump delivery passage 159k (Fig. 6) delivers the pressure fluid through a conduit 257 which opens to annular recess 258 formed in sleeve 255. This recess selectively communicates, through ports 259 which extend through sleeve 255, with the aforesaid second and third speed pressure fluid supply pipes 132 and 131 respectively under control of valve 253.

The third speed delivery pipe 131 opens to the annular sleeve recess 260, the sleeve having the valve controlled pressure inlet ports 261 and the drain ports 262 opening downwardy to the inwardy extending drain 263 which permits the fluid to flow into casing 31 where it collects in the well or reservoir at 159h. The second speed delivery pipe 132 opens to annular sleeve recess 264, the sleeve having valve controlled ports 265 which at times serve as fluid inlet ports and at other times serve as drain ports for draining pipe 132 inwardly of the sleeve thence through sleeve drain ports 265a to the inwardly extending drain outlets 266 whence the fluid passes to casing 31 as in the case of drain 263.

Valve 253 has the axially spaced relatively short and long heads 267 and 268 respectively, these heads slidably fitting sleeve bore 254 and between these heads the valve has an annular recess 269. In Fig. 12 the valve is in its neutral position, the construction line 270 indicating the neutral position of a point 271 on the valve axis 272. When segment 241 moves valve 253 to the settings for "R," "1," "2," "3" then the point 271 occupies corresponding positions at the intersection of axis 272 with lines 273, 274, 275 and 276 respectively.

With valve 253 in the illustrated neutral position, which may be conveniently referred to at 270, the pressure fluid delivered by pipe 257 fills ports 259 and recess 258 but is then blocked by the valve head 268, pipe 132 draining through sleeve recess 264, ports 265, valve recess 269, ports 265ᵃ and drain outlets 266. Pipe 131 drains through sleeve recess 260, ports 262 to the space below the valve and thence through outlet 263.

When valve 253 is moved to its first speed position 274, illustrated in Fig. 13, pressure delivery ports 259 are still closed by valve head 268 and the lines 131 and 132 are draining as in the neutral position. It will be remembered that transmission 21 has an inherent forward drive to shaft 39 independently of pressure fluid delivery from pump 149.

When valve 253 is moved to its second speed position 275, illustrated in Fig. 14, the third speed sleeve inlet ports 261 are still closed by valve head 268 but now this head has uncovered ports 259 so that pressure fluid is delivered from sleeve recess 258 to valve recess 269 thence through ports 265 and sleeve recess 264 to the second speed delivery pipe 132. At this time valve head 267 has moved below drain ports 265ᵃ to close communication between supply pipe 132 and drain outlets 266. The third speed supply pipe 131 is still open to drain outlet 263.

When valve 253 is moved to its third speed position 276, illustrated in Fig. 15, valve head 267 moves below ports 265 to shut off pressure fluid delivery to the second speed pipe 132, this pipe now draining through ports 265, 265ᵃ and outlets 266. Head 268 has uncovered ports 261 and closed drain ports 262 so that pressure fluid is supplied to the third speed supply pipe 131.

When valve 253 is moved to its reverse position 273, illustrated in Fig. 16, valve head 268 closes sleeve ports 259 so that no pressure fluid is delivered to either of pipes 131 or 132. Drain ports 262 are open to drain the third speed supply pipe 131 although the second speed supply pipe 132 is not open to drain because valve head 268 at this time closes ports 265. However, the second speed motor 93 can never operate during reverse because reverse is always selected from a previous setting when pipe 132 is open to the drain outlets 266 to thereby relieve the pressure fluid to release the second speed brake 89. Thus, in shifting from second to reverse, the valve 253 must pass through its positions of low at 274 and neutral at 270 and in both of these positions the second speed supply pipe 132 is open to drain outlets 266 as aforesaid.

It will be apparent that the vehicle driver may selectively manipulate lever 165 to any of the positions of transmission control to thereby move the valve 253 to a corresponding position, although pressure fluid is delivered beyond the valve only in the second and third speed settings of selector lever 165 and valve 253. Before describing the operation of the primary control means we will describe the secondary or kick-down control so that the operation as a whole may be referred to.

In Fig. 1 the usual toe-board 277 mounts an accelerator pedal 278 at pivotal support 279, a spring 280 serving to yieldingly urge the pedal to its throttle closing position. The intake manifold 201 has the usual throttle valve 281 operated by lever 282, a stop 283 being engaged by lever 282 for limiting movement of the throttle valve when fully open. Between pedal 278 and lever 282 is a mechanism for opening the throttle valve by the pedal, the latter having an overtravel beyond the wide open throttle setting to thereby cause the transmission to be manipulated from a drive condition to a slower speed ratio drive independently of manipulation of the primary control at selector lever 165.

Lever 282 (Fig. 4) has pivotal connection by a pin 284 with a guide connector 285 having a bore 286 slidably receiving the forward end of rod 287 the rear end of which is articulated at 288 to pedal 278. Fixed to rod 287 is a collar 289, a spring 290 acting between guide connector 285 and collar 289, this spring being sufficiently strong so that for all movements of pedal 278 to cause valve 281 to move between its limits of fully closed and fully open positions the rod 287 and connector 285 move together without any lost motion. However, when the pedal 278 is depressed to fully open valve 281, then further depression of the accelerator pedal causes rod 287 to slide in the bore 286 of the connector 285, the latter now being held against forward movement by stop 283. A bracket 291 limits separation of rod 287 and connector 285 by spring 290, this bracket having a supporting front portion 292 curving around the forward end portion of connector 285 and a rear flange 293 slidably receiving rod 287 and providing an abutment for collar 289.

Supported at pivot pin 294 to engine 20 is a kick-down lever 295 having an arm 296 forked at its upper end 297 to slidably receive rod 287, the other arm 298 being connected to a rod 299 having its rear end portion 300 so disposed that when lever 237 (Fig. 8) occupies its third speed position of adjustment this lever will engage rod end 300. In Fig. 8 the center line positions of lever 237 for corresponding selective positions of selector lever 165 at "R," "N," "1," "2" and "3" are respectively indicated at 301 to 305 inclusive.

The kick-down control is effective, in the present embodiment of our engine, only when the selector lever 165 is set for its fastest drive, which is at the third speed setting for locating lever 237 adjacent the rod end 300. In order to operate the rod end 300 only after the accelerator pedal 278 has been depressed to cause wide open positioning of throttle valve 281, rod 287 carries a collar 306 which engages lever end 297 at the wide open throttle position of rod 287 so that on further forward rod movement the lever 295 will be operated to cause rod end 300 to move lever 237 from its third speed position 305 to its second speed position 304, with the selector lever left at station "3" so that when the accelerator pedal is released, at least back to the wide open throttle position, the lever 237 will be restored to its third speed position 305.

In order to carry out the foregoing, spring 240ᵃ comes into action so that with rod 232 held in the third speed position, lever 237 may be moved by rod end 300 as aforesaid, this spring 240ᵃ restoring lever 237 to the third speed position on forward movement of rod 299. In order to hold rod 232 while lever 237 is thus moved to compress spring 240ᵃ it is apparent that some form of detent or other means must be provided stronger than the action of springs 240ᵃ, 192ᵃ and ball detent 247. Such detent means is shown in Fig. 2A wherein selector lever 165 carries a cylinder 307 housing a relatively heavy spring 308 loaded by adjustable set screw 309 to urge a detent ball 310 selectively into one of the notches 311, one notch being disposed at each station of selector lever 165 to advise the operator of the proper positioning of lever 165 and to hold lever 165 and the mechanism connected thereto up to spring 240ᵃ so that, with lever 165 held in the third speed, setting rod 300 may actuate lever 237 and valve 253 from the third speed positions to the second speed positions by compressing spring 240ᵃ and operating sector 241 so that detent 247 will accommodate this valve movement. As aforesaid, detent 247 may be omitted but when made of small resistance assists in locating sector 241 in its selective positions.

The kick-down lever 295 is returned, after operation, to the Fig. 1 position by a spring 312, a collar 313 on rod end 300 serving to limit return movement by striking against a fixed rod guide 314 which slidably guides rod 299 with sufficient clearance both at the guide and at lever arm 298 to accommodate the slight swing of the forward end of rod 299 by lever 295.

In starting the vehicle from a standstill, the driver disengages the main clutch 22 by depressing pedal 30 and then the driver may, for example, operate lever 165 from "N" to "1." The clutch 22 is allowed to engage with simultaneous depression of the accelerator pedal 278 to accelerate the vehicle in low speed. When lever 165 is moved from "N" to "1," Bowden wire mechanism 167 actuates lever 171 to cause finger 180 to swing away from lever 181 whereby spring 192ᵃ comes into action to adjust leader valve 205 so that follower piston 211 of motor 203 will operate by vacuum from pipe 200 to shift sleeve 151 from the neutral position in Fig. 5 to clutch with teeth 155, thereby establishing a forward drive through the first planetary gear set of transmission 21. The distributor valve 253 is also adjusted, by arm 229 of lever 171 acting through spring 240ᵃ, lever 237 and segment 241, so that this valve 253 is moved from the neutral position in Fig. 12 to the low speed position in Fig. 13. However, such adjustment does not supply pressure fluid to either the second speed motor 93 or the third speed motor 134.

Assuming that selector lever 165 is then shifted to station "2" for the second speed drive through the transmission, this shift is not accompanied by release of the main clutch 22 because shift sleeve 151 stays clutched with teeth 155 as long as selector lever 165 is set for a forward drive speed. Lever 181 merely is held by stop 226 while finger 180 swings away from the lever. However lever 171 acts through rod 232 and spring 240ᵃ to shift lever 237 as well as segment 241 and valve 253 from the first speed position of these parts to their respective second speed positions at which time the valve 253 is positioned as shown in Fig. 14. Pressure fluid from pump 149 is then admitted to the second speed supply pipe 132 to cause motor 93 to smoothly actuate brake 89 to hold sun gear 63 as aforesaid whereby transmission 21 is set to provide the compound drive through the first and second planetary gear trains in the intermediate speed ratio.

While it is not necessary to do so, the driver in selecting second, from the drive in first, may let up somewhat on the accelerator pedal to slow down the engine to approximately the speed it will assume when brake 89 engages, lessening the wear on the friction elements and letting up on the engine torque delivered to the transmission to facilitate the smooth transition to the speed ratio change.

Assuming now that the driver adjusts selector lever 165 to station "3" for the third speed or direct drive, it will be apparent from the foregoing that the distributor valve 253 will be moved through spring 240ᵃ, as for the second speed selection, to position the valve at its third speed setting illustrated in Fig. 15. This causes the pressure fluid to be delivered from the pump 149 to the third speed pipe 131 to cause motor 134 to operate clutch 104 for the direct drive. At the same time the second speed motor 93 is vented through valve 253 to the reservoir 159ʰ thereby releasing brake 89, springs 102 assisting evacuation of the fluid from motor 93.

In shifting selector lever 165 from station "3" to "2" or "N," the parts are manipulated to the positions hereinbefore described in connection with the shifts to faster driving ratios. However, it is noted that when neutral is selected from a forward drive setting, finger 180 picks up lever 181 in selecting down from first to cause operation of leader valve 205 forwardly. This produces a power operation at motor 203 for shifting clutch sleeve 151 rearwardly to its neutral position, free from teeth 155.

When reverse is selected at selector lever 165, finger 180 moves lever 181 to its position at 228 causing the motor 203 to move the clutch sleeve 151 rearwardly to clutch with teeth 156 to establish the reverse drive through the transmission. In returning to the neutral setting of selector lever 156, the lever 181 is returned to the neutral position of Fig. 8 by spring 192ᵃ which also controls the motor 203 to effect return of sleeve 151 to the neutral setting of Fig. 5.

Obviously, the driver may manipulate selector lever 165 other than in the regular sequence of progression of its station settings. For example, in shifting up from neutral, the selector lever may be directly moved to "2" or "3."

In connection with the secondary selector control means operable in response to manipulation of the throttle controlling means at the accelerator pedal 278, the transmission may be stepped-down for a faster drive whenever the vehicle is being driven in its top speed ratio which, in this instance, is the direct or third speed drive. This kick-down control is desirable in many instances and under a variety of driving conditions as for obtaining greater engine driving power and torque to pass another vehicle more rapidly than would be possible in the third speed ratio; also to climb a grade or wherever a more favorable torque multiplying drive is desired.

Whenever the vehicle is driven in its third speed setting, with selector lever 165 at station "3," a natural action by the driver in depressing the accelerator pedal 278 beyond its wide open throttle position causes rod 287 to overtravel the throttle operating lever 282 by the lost motion mechanism of Fig. 4. This operates rod 299 to shift lever 237 from position 305 (Fig. 8) to position 304 causing a corresponding adjustment in distributor valve 253 from its third speed setting (Fig. 15) to its second speed setting (Fig. 14) thereby effecting release of the third speed clutch 104 and engagement of the second speed brake 89. This transmission drive change is thus made with the throttle valve 281 wide open so that the engine naturally speeds up for this change to the faster drive in second. Furthermore, the kick-down shift is obtained with selector lever 165 left at station "3" so that on release of the accelerator pedal to the wide open throttle position, or less, the direct drive is automatically restored by the spring 240ᵃ restoring the valve 253 to its Fig. 15 position.

If the accelerator pedal is operated for kick-down at any time other than when the transmission is set for third, rod 299 is operated without any effect on the lever 237.

In view of the arrangement of drivingly connecting pump 149 with the driven shaft 44, whenever sleeve 151 is clutched with teeth 155 for a forward drive in any of the forward speed ratio settings of selector lever 165, and since the low speed ratio drive is provided independently of the pump 149, our transmission system provides for automatic step-up in the drive without the complication of mechanism usually attendant to automatic change speed devices.

Thus, for example, when the vehicle is driving under normal conditions in the third speed and a temporary stop is made, as at a traffic light or stop highway, the selector lever 165 is preferably left at station "3" and the vehicle is brought to a stop by the application of the usual vehicle brakes and release of the main clutch 22. When the vehicle stops, the pump 149 is no longer driven and the pressure is immediately relieved in the third speed supply pipe 131, the springs 108 assisting in evacuating the fluid at the third speed motor 134. The pump delivery at 159ᵏ, 159ᵐ is quickly relieved by back-flow of the fluid through pump 149, this pump therefor preferably being of a type which does not hold pressure on stopping for any great length of time. This is an aid to manufacture since it is not necessary to hold the limits as closely as in instances where a pump must hold a back-pressure against leakage. Back-flow is also facilitated through vent 159ᵗ if valve 159ˢ is set for fluid flow therethrough. This vent, when employed, offers a convenient setting on the pump back-flow characteristics and obviously may be employed in lieu of a pump of the back-flow type.

The drop in pressure fluid will, of course, effect release of the third speed clutch 104. When the vehicle is then to be accelerated, the operator depresses the accelerator pedal all the way down viz., for the kick-down, thereby setting valve 253 for the second speed drive position of Fig. 14, selector lever 165 remaining at station "3." The vehicle will be accelerated in low or first because, although valve 253 is set for second, it takes an appreciable running of the vehicle to cause the pump 149 to build up sufficient pressure to operate the second speed motor 98, especially since springs 102 must be overcome and the conduit system from the pump to the motor filled.

As soon as the pressure fluid starts to build up to operate motor 98 to a certain degree less than full operation, the sun gear 63 has its backward rotation retarded, but not entirely checked, and the speed ratio progressively and smoothly increases faster than the low speed ratio until, when slippage of the friction mats at brake 89 ceases, the sun gear 63 is fixed and the second speed ratio drive takes place. Of course, the slippage does not take place over any great length of time and the pressure build-up characteristics of the pump may be provided to engage brake 89 with any desired amount of slippage.

The driver then releases the accelerator pedal sufficiently to release the kick-down control and, since selector lever 165 was left at station "3," the pressure fluid is then relieved at the second speed motor 93 and diverted to the third speed motor 134 to effect the third speed drive just as in restoring the direct drive from a kick-down operation aforesaid. Therefore the vehicle may be accelerated through the various speed ratio drives without requiring any manipulation of the selector lever 165 from its third speed setting.

Of course, if desired, the vehicle may be accelerated or driven in any of the speed ratios by an appropriate setting of the selector lever 165. Furthermore, if on initial acceleration of the vehicle from a stop, the selector lever 165 is moved back from "3" to "2" the vehicle is accelerated in low with automatic change to second in response to pressure build-up at the pump 149.

If the driver desires to increase or decrease the build-up of pump pressure and thereby quicken or reduce the time of drive in low before the faster drive takes place, he has only to pull or push control 159ʷ (Fig. 1) to correspondingly screw the vent valve 159ˢ (Fig. 6) upwardly for greater oil escape or downwardly for less or no oil escape through vent 159ᵗ. Also, varying oil viscosities as in winter start-up may be readily compensated for by this escape vent control and the varying desires of different drivers easily accommodated without attempt to hold the pump leakage to a predetermined compromising degree.

In accelerating the vehicle, with the selector lever 165 left at station "3" after making a stop, the vehicle may of course be accelerated without depressing the accelerator pedal sufficiently to operate the kick-down secondary control. Under such conditions, the drive takes place in low as before, and as the pump builds up pressure the clutch 134 gradually engages while slipping to gradually and progressively retard sun gear 63 from backward rotation and then forwardly rotating the sun gear 63 until it drives with the driving shaft 28. Thus the transmission progressively increases its drive from low to second to direct. As before, the pump pressure build up is determined by the pump efficiency, the capacity of the conducting system from pump to motor, the force of the motor return springs, and the variable setting of valve 159ˢ when employed.

The motors 93 and 134 and their respective brake 89 and clutch 104 are preferably balanced in the sense that the torque through each is accommodated by the same pressure of the fluid. Thus, while motor 93 for checking the second speed reaction at sun gear 63 requires more force application than is required for clutch 104, the brake 89 has its friction plates at a more favorable force arm or distance from the common axis of rotation in comparison with the force arm of the third speed clutch friction plates. The desired balance, to avoid harshness of operation and undue slippage, is primarily compensated for by the varying areas of pistons 95 and 123.

The accelerator pedal will not be unintentionally depressed for kick-down because of the additional resistance encountered by this pedal to movement beyond the wide open throttle position. Thus when stop 306 actuates lever 295, springs 312 and 240ᵃ offer a very noticeable resistance to pedal movement such that the wide open throttle position of the accelerator pedal is easily determined since, at this time, the springs 312 and 240ᵃ come into action.

Referring now to the embodiment of our invention illustrated in Figs. 17 to 23, the transmission 21ᵃ is, for the most part, identical with transmission 21 especially from driven shaft 24 forwardly up to spider 75, the exception being in connection with means for releasing the reaction effect which, in Fig. 5, prevents the annulus gear of first speed train from rotating backwards in the low speed drive. We have therefore not duplicated the Fig. 5 showing in its entirety and similar reference characters in Fig. 18 and other figures of this modified showing represent parts similar to the aforesaid embodiment of Figs. 1 to 16.

In Fig. 17 we have illustrated a fluid coupling 22ᵃ which is used in place of the more conventional friction type of main clutch 22. In general the attributes of a fluid coupling are well known in conjunction with motor vehicle drives. A coupling of this character, among other things, provides a cushioning effect on the drive and particularly during speed ratio changes; permits the vehicle to be held on a hill by driving the engine just enough to balance the backward roll tendency by utilizing the slip drive effect in the coupling; and affords a drive connection which does not wear out as in the case of the friction clutch 22.

In applying a fluid coupling to our Fig. 5 transmission, for example, it is desirable to negative the tendency of the driven part or runner to follow the driving part or impeller with the engine idling, and at other times, so that shifting movements of sleeve 151 may be made easily and without damage to clutch teeth 155 and 156, also so that the vehicle may be brought to a stop with the selector lever 165 set for one of its forward drives or for reverse drive without tendency of the vehicle to creep by reason of the tendency of the coupling runner to follow the impeller and without requiring application of the vehicle brakes to prevent this creep.

We have provided the following means to utilize a fluid coupling in the Fig. 5 arrangement with or without any other modifications of the Fig. 5 transmission. The fluid coupling 22ᵃ is of any well known vane-type construction and comprises the impeller 320 carried with engine flywheel 25ᵃ and loosely journalled on the shaft 28. The runner 321 has a splined connection 322 with shaft 28 for driving this shaft by reason of the fluid circulated in the coupling by the impeller 320.

Referring now to Figs. 18 and Figs. 21 to 23, the control device 70' is identical with the aforesaid device 70 except that now the outer cylinder member 67' is not fixed to the casing but instead is allowed, at times, to rotate freely. Thus, cylinder 67' is fixed, for convenience of manufacture, with a rotatable brake drum 323 which has a spider 324 formed with circumferentially spaced inwardly extending lugs or teeth 325 (Fig. 23) adapted to fit in spaces provided by corresponding axially extending lugs 326 formed on cylinder 67'. The spider 324 abuts a shoulder 327 of cylinder 67' and relative axial movement of drum 323 and cylinder 67' is prevented by an expanding snap ring 328 which fits into an annular groove 329 formed in the lugs 325 and 326. The spider 324 is journalled at lugs 325 on the bearing ring 66 which also centers the forward end of cylinder 67'. The Fig. 23 connecting means provides for driving connection between drum 323 and cylinder 67' and occupies a very small space thereby preserving the compact arrangement of parts, drum 323 being preferably flanged forwardly to overlie the annulus gear 56.

Drum 323 is arranged to be held against rotation except when it is desired to disconnect the engine from driven shaft 44 without requiring sleeve 151 to be shifted from teeth 155 or 156 to its neutral position.

The transmission casing 31' is formed with a cylindrical bore 330 which slidably receives the anchor pin 331 carried by a contractile brake band 332 carrying friction braking material 333 engageable, on contracting band 332, with drum 323. The lower ends 334, 335 of the band are thrust toward each other by a group of heavy duty concentrically arranged coil springs at 336, 337, 338 whose opposite ends act against seats 339 each of which carries a pin 340 thrusting in a groove 341 of a lever 342. Each lever is fulcrumed at a groove 343 by an adjustable fulcrum screw 344 threadedly engaging the casing boss 345, a lock nut 346 holding screw 344 in any position of threaded adjustment. At its upper end each lever 342 is connected by a thrust link 347 with one of the band ends 334, 335.

Each boss 345 is formed with a cylinder 348 closed at its outer end by a plate 349, a pressure fluid supply pipe 350 having branch conduit portions 351 and 352 which respectively introduce pressure fluid into cylinders 348. Each cylinder slidably receives a piston 353 adapted to thrust a rod 354 which is articulated at 355 to the lower end of a lever 342. A spring 356 acts against a plate 349 to hold a seal packing 357 against a piston 353 and to hold the piston and linkage parts in assembled relation, it being apparent that springs 336, 337 and 338 will swing levers 342 and move pistons 353 outwardly until band 332 tightly engages drum 323.

A suitable pressure fluid supply and control therefor is provided for the pipe 350 whereby pistons 353 may be simultaneously moved toward each other to unload the spring group sufficiently to allow band 332 to expand away from drum 323 to thereby release the drum and cylinder 67' of the reaction control device 70'.

In Fig. 17 we have provided such brake releasing means in the form of a driver operated pump similar to a master cylinder arrangement for a conventional pressure fluid brake system. A cylinder 358 is supplied through inlet 359 with fluid from a reservoir 360, the cylinder slidably receiving a piston 361 operated forwardly in delivering pressure fluid through pipe 350 by a rod 362 connected to a lever 363 having a pivotal support at 364 and a pedal operating upper end 365 preferably disposed to take the place of the clutch pedal 30 in Fig. 1. The pedal 365 is, in effect, a clutch pedal since its actuation provides disconnection of the engine and driven shaft 44 to interrupt the low speed transmission drive in bringing the vehicle to a stop. Depressing pedal 365 during a vehicle drive in second or third will not have any effect since at such times there is no reaction of annulus gear 56 at control 70', the latter being free by accommodating forward rotation of cylinder 65.

In operation of our Fig. 5 transmission equipped with the Fig. 22 releasable braking device on the cylinder 67' of control device 70', the spring group 336, 337, 338 applies sufficient force at band 332 to normally held cylinder 67' during all forward and reverse drives just as described for the Fig. 5 transmission. In other words, as long as pedal 365 is not operated the Fig. 22 braking device applied to the Fig. 5 transmission will not change the functioning of the latter. While the Fig. 22 arrangement is employed especially for a fluid coupling type of main clutch, it may of course be used to supplement the clutch 22 of Fig. 1.

When making a stop from reverse or any forward drive, leaving sleeve 151 clutched rearwardly or forwardly as the case may be, pedal 365 is depressed to release band 332 thereby releasing cylinder 67' and allowing rotation of coupling runner 321 without tendency to drive the vehicle. In starting again, the pedal 365 is let in, just as in the case of pedal 30, to initiate a drive connection between the engine and driven shaft 24. Thus, release of pedal 365 restores piston 361, by any suitable spring at some point in the linkage as at 366, relieving the pressure fluid at cylinders 348 to cause the spring group between seats 339 to engage band 332 with drum 323. This holds the cylinder 67' so that control device 70' locks to prevent backward rotation of annulus gear 50 and thereby effect the low speed drive through the transmission.

After the vehicle has been started the pedal 365 may be left in its released position and all forward drives obtained by the selector lever 165, the pump 149 and the kick-down secondary control from the accelerator pedal 278 operating just as described in connection with Figs. 1 to 16.

If desired, the driver in applying the usual vehicle brakes and bringing the vehicle to rest (with selector lever 165 left in its setting for "2" or "3") may, instead of depressing pedal 365, maintain a light pressure on the brakes to neutralize any tendency of the vehicle to creep with the engine idling. The engine will, of course, continue to idle because of the inherent slip afforded by the fluid coupling between the engine and vehicle driving ground wheels. Many stops are made on slight downgrades which require application of the vehicle brakes in any event and for stops on slight upgrades it will often be found that, where the fluid coupling has an appreciable inherent creep characteristic, the vehicle will hold without requiring application of the vehicle brakes. In many other instances a slight amount of creep, in coming to a stop, will not bother the driver sufficiently to warrant application of the vehicle brakes.

For reverse, the pedal 365 is depressed to release the transmission low speed drive, and selector lever 165 moved to "R" to effect shift of clutch sleeve 151 with teeth 156. The pedal 365 is then released to cause the reverse drive through the transmission low speed and the reverse countershaft gear set at 33.

Since the Fig. 21 brake with the release means operated by pedal 365 affords means for releasing the engine drive, it is apparent that if desired any additional means, such as coupling 22ª or clutch 22, may be entirely omitted.

In Fig. 18 we have illustrated a further modified arrangement which may be used to advantage either with a friction type main clutch 22 or with a fluid coupling 22ª; and since this arrangement is illustrated as employing the Fig. 21 brake means the clutch 22 or coupling 22ª may be omitted as aforesaid.

For purposes of illustration, and by preference, the Fig. 18 transmission 21ª is driven by engine 20 through fluid coupling 22ª. The use of the fluid coupling renders the use of the releasable braking means of Fig. 21 desirable and therefore we have illustrated this braking means in conjunction with our Fig. 18 transmission.

In Fig. 18 the second speed sun gear 63ª is, as before, loose on the driving shaft 28 but is now connected to its spider 75ª by an intermediate cylinder 370 coaxial with shaft 28. The inner surface of cylinder 370 is cylindrically formed at 371 to provide the outer member of an overrunning clutch 372 and is engaged by clutching rollers 373 spaced by cage 374. The cam member 375 of clutch 372 is splined at 376 to shaft 28. The clutch 372 allows cam member 375 to run forwardly faster than cylinder 370 but rollers 373 will wedge to prevent cylinder 370 from rotating forwardly faster than cam member 375.

The outer surface 377 of cylinder 370 is cammed to provide the inner member of another overrunning control or braking device 378 whose outer cylindrical member 379 carries a spider 380. Rollers 381 spaced by cage 382 are wedged to prevent backward rotation of cylinder 370 (opposite to arrow 383) faster than backward rotation of member 379 but rollers 381 freely permit forward rotation of cylinder 370 faster than forward rotation of member 379. The member 379 is centered in a cylindrical sleeve 384 yieldingly located in an opening 385 of the transmission casing wall 386 by the annular rubber bushing 387 preferably secured by well known commercial processes to the wall 386 and sleeve 384. This rubber bushing relieves any eccentric loading by compensating for any minor misalignments of the associated parts therewithin and also serves to dampen vibrations and shocks of the transmission parts.

In Fig. 18 the spider 380 carries the drum 76ª and the motor 93 actuates the braking device 89 to hold drum 76ª against rotation just as for drum 76 in Fig. 5. Likewise spider 75ª is formed with a drum 388 adapted for clutching with shaft 28 by the motor 134 and clutch 104 similar to the clutching of drum 76 in Fig. 5.

The control for the Fig. 18 transmission is identical with that illustrated in connection with Fig. 1 with the exception of a modified type of distributor valve means 240ª substituted for the corresponding valve means 240 and, of course, since the fluid coupling 22ª is employed the drive releasing means of Fig. 21 with its control pedal 365 is substituted for the friction type clutch 22 and its releasing pedal 30. While it is not necessary to change the valve means 240 when employing the Fig. 18 arrangement, we preferably modify the valving means 240 in order to obtain certain benefits possible with the Fig. 18 transmission especially in combination with valving means 240ª which is arranged so that when third speed is selected by selector lever 165, the brake 89 as well as clutch 104 are engaged.

In Figs. 20, 20A and 20B the valve means 240ª has the same construction as the valve means 240 except for the construction of valve member and the location of uppermost sleeve vent ports. Thus in Fig. 20 the sleeve 255ª is identical to sleeve 255 (Fig. 12) except that the vent ports 389 (corresponding to ports 265ª of Fig. 12) are now positioned higher so that when valve 253ª is in the third speed position (Fig. 20) the second speed supply pipe 132 is not drained.

The valve 253ª has the heads 267ª and 268ª functioning just as the heads 267 and 268 of Fig. 12. No pressure fluid is supplied to pipes 131 and 132 for settings of the selector lever 165 at "R," "N" or "1" but for the setting "2" (Fig. 20B) pressure fluid is supplied to pipe 132 and for the setting "3" pressure fluid is supplied to pipe 131 with pipe 132 continuing to be supplied with pressure fluid as in Fig. 20. The neutral setting in Fig. 20A corresponds to the setting of valve 253 in Fig. 12.

In the operation of the Fig. 18 transmission, the selector lever 165 may be selectively set at any of the stations on plate 163 to correspondingly set the transmission, pedal 365 being employed to release the annulus gear 56 to thereby facilitate shifting clutch sleeve 151 for the forward and reverse drives; also for making a temporary stop with the engine idling and with the selector lever 165 left at "1", "2" or "3" preparatory to accelerating the vehicle. The vehicle acceleration may be obtained by selective progressive step-up at the selector lever or by leaving the selector lever at "2" or "3" and obtaining the automatic progressive speed ratio changes by the pump pressure build-up and, for a start in setting "3" by further use of the secondary control mechanism or kick-down just as aforesaid in connection with Figs. 1 to 16.

The Fig. 18 low speed drive has certain characteristics differing from the Fig. 5 low speed drive conditions. In Fig. 18 there is no free-wheeling as in Fig. 5 because the driving shaft 28 cannot drop below the speed of the driven shaft 44. Thus, with the vehicle driving the engine, any tendency of the driven shaft to overrun the driving shaft causes the annulus gear 56 to overdrive, this in turn acting through planet gears 62 to tend to overdrive the sun gear 63a which however is prevented by clutch 372 locking the sun gear with the driving shaft. This is of great advantage in providing smooth and quick shifting because the engine, with selector lever set at "1", "2" or "3," is never accelerated from an idling up to the speed ratio setting; also the engine cannot stall, and further, a dead engine may be started by towing the vehicle without requiring a build-up pressure at pump 149. In changing speeds from third to second or low, the engine never speeds up more than the ratio of the change and the vehicle cannot be jolted or lurched because the engine cannot drop below the speed of the driven shaft.

In connection with the second speed drive wherein brake 89 is held, sun gear 63a tends to drive backward and by holding cylinder 379 fixed this backward or reaction rotation of the sun gear 63a is prevented because overrunning device 378 acts to wedge rollers 381 as soon as cylinder 370 tends to rotate backward with cylinder 379 held. When sun gear 63a is thus held, a compound second speed ratio drive is obtained just as in Fig. 5. During the second speed drive, the clutch 104 is released so that with cylinder 370 held against rotation, the overrunning clutch 372 is free because its rollers 373 are not wedged by this action.

In the second speed setting, when the vehicle tends to overrun the engine, the engine or speed of the driving shaft 28 is permitted to drop down only to the speed of the driven shafts 44, 24. Under such conditions sun gear 63a and its cylinder 370 rotate forward freely away from rollers 381 (while cylinder 379 is held by brake 89) until, when the second speed ratio is overcome by sun gear 63a reaching the speed of driving shaft 28, this sun gear by its cylinder 370 then wedges rollers 373 to lock this sun gear with the driving shaft. The engine is therefore utilized as a brake in second speed by a direct drive from shaft 24 to shaft 28. When the engine is again speeded up, clutch 372 is released, the tendency of backward rotation of sun gear 63a is prevented by device 378, and the second speed ratio drive to shaft 44 is again obtained through the compounding of the first and second planetary trains as aforesaid.

The provision of the arrangement whereby, when coasting in second speed setting, the engine cannot drop down below the speed of the driven shaft is especially beneficial in a shift down from third speed. If such a shift down is made during coasting, then there is no jolt because shafts 28 and 44 are synchronized both before and after shift down. If such shift down is made while accelerating with the engine driving the vehicle, as by use of the kick-down control or by the selector lever 165, then the drive shaft 28 merely accelerates by the amount of the second speed gearing to smoothly and quickly pick up the driven shaft 44.

When third or direct is selected from the position "2" of selector lever 165, or by release of the accelerator from a kick-down operation, the distributor valve is moved from the position in Fig. 20B to the Fig. 20 position so that pressure fluid is simultaneously supplied to pipes 132 and 131. Thus, without interrupting the previously engaged condition of the second speed brake 89, the clutch 104 is engaged so that there is no dwell in the driving continuity and no driving time lost in making the shift either in changing up from second to third or in changing down from third to second.

When the direct control clutch 104 is engaged, shaft 28 is directly clutched with sun gear 63a and the two gear trains lock-up and revolve as a unit with shafts 28 and 44. Clutch 372 has no action because cam 375 and cylinder 370 rotate together by the clutching of the shaft 28 with spider 75a. Cylinder 370 rotates freely forwardly and cylinder 379 is held by brake 89. There is no free-wheeling action in the third speed drive setting.

In shifting selector lever 165 from "2" to "3," the driver may simultaneously let up on the accelerator pedal to decelerate drive shaft 28 and thereby synchronize sun gear 63a with shaft 28 by an automatic synchronous locking of clutch 372 equivalent to vehicle coasting in second speed as aforesaid. This will synchronize the clutching parts of clutch 104 and thereby reduce clutch wear, it being again pointed out that the arrangement at clutch 372 prevents sun gear 63a from dropping below the speed of shaft 28 while in second speed setting.

While driving in the third speed ratio setting, our arrangement provides a fast shift down from third to second, either by shifting selector lever 165 from "3" to "2" or by leaving lever 165 at "3" and fully depressing the accelerator pedal 278 for the kick-down operation. This releases the direct clutch 104 by venting motor 134 through pipe 131 and ports 262 (Fig. 20B). However, the second speed brake 89 maintains its engaged condition and the natural action of the driver maintaining the engine throttle valve open as in the case of shifting selector lever 165 from "3" to "2" (the throttle valve being held wide open during the accelerator pedal kickdown shift) causes the engine, which is suddenly unloaded by disengagement of clutch 104, to race or speed up until checked by rollers 373 wedging and preventing backward rotation of cylinder 370 and sun gear 63a. When driving in third this sun gear rotates forwardly at the speed of driving shaft 28 and during acceleration of the driving shaft on a shift down change, by the primary or secondary control, the sun gear 63a and cylinder 370 rapidly decelerate to zero rotation and then device 378 locks these parts to prevent reaction or backward rotation. The drive in second is therefore synchronously established and cannot take place until the second speed driving ratio is established between shafts 28 and 44.

We desire to point out that during the direct or third speed ratio drive, which constitutes the major portion of the driving condition of the transmission, there is no rubbing of the parts of the second speed clutch 89 which would cause wear of the friction mats and generate heat; clutch 89 is engaged during the third speed drive.

The cluch control device 372 is incorporated, rather than omitted, in order to insure against free-wheeling of the vehicle in low speed and to facilitate speed changes and obtain other characteristics attendant thereto as aforesaid.

Because of the arrangement, whereby, in shifting to third (either by the selector lever 165 or by release of the accelerator pedal from kickdown), the driving shaft 28 cannot drop below the speed of the driven shaft, the clutching parts of the direct clutch 104 are automatically synchronized and the direct clutch could be of the positive jaw type such as the well known Maybach clutch.

In the Fig. 18 arrangement, when the lever 165 is set for any forward drive, the engine or shaft 28 can never drop below the speed of the driven shafts 44 and 24 so that there is never any free-wheeling in the sense of the driven shaft overrunning the driving shaft. The driven shaft picks up the engine in direct when the vehicle drives in the low speed setting, unless of course pedal 365 is depressed, and the vehicle also drives the engine in direct when in the second and third speed settings.

In this Fig. 18 arrangement, the vehicle may be started by automatic progressive shifts just as in Fig. 5 but with certain further advantages of a progressive shift from low to third without as much wear on the third speed clutch as in Fig. 5. This is particularly so when starting is made without the benefit of the kick-down control for obtaining the shift from second to third. Thus, when stopping the vehicle, the lever 165 is preferably left in its previous normal condition of direct drive at "3," and the pump 149 will stop and the pressure will drop in the third and second speed oil supply lines just as in Fig. 5 the pressure in the third speed supply line drops under corresponding conditions. However, on starting in the low speed, the oil pressure on building up as before, now is supplied to both of the motors 93 and 134 (assuming that the accelerator pedal was not depressed for kick-down beyond wide open throttle) so that progressive build-up in second speed passes through second to high assisted by the second speed brake 89. Therefore the Fig. 18 arrangement is preferred for a start in a direct setting although with the kick-down control such a start is preferably made with lever 165 left at "3" and the accelerator pedal fully depressed to obtain low and then second; then the accelerator pedal is at least partly released to obtain direct. Of course, with the Fig. 18 arrangement, the lever 165 may be shifted from "3" to "2" when making a stop and the vehicle will be accelerated as in Fig. 5 under such conditions because in such event only motor 93 is open to the pump. In any event, the driver may of course shift lever 165 to low at "1" and drive indefinitely, as desired, irrespective of the pump pressure build-up.

When the vehicle is to be stopped for more than a temporary stop, as in parking, then the driver will move selector lever 165 to neutral, causing motor 203 to shift clutch sleeve 151 to neutral. The vehicle is thus left with the engine free from driving couple with driven shaft 44 so that in starting the engine it is not necessary to depress pedal 365.

In Fig. 24 we have shown a modified form of anchorage for the braking means for drum 323, for use in lieu of the band 332. The modified band 332$^a$ carries the same lining 333 but the anchor pin 331$^a$ extends through opening 330$^a$ in the casing 31$^a$, the anchor pin 331$^a$ carrying a fixed spring abutment ring 390. A conical coil spring 391 seats on the casing face 392 and thrusts upwardly against ring 390 to yieldingly support the band 332$^a$ so that when the band is unloaded by the pistons 353 it will not drag against the drum 323. A cover plate 393 encloses the spring 391 and the upper end of pin 331$^a$.

Instead of yieldingly supporting the band assembly at the top, we may support the assembly at the band ends as illustrated in Fig. 25 for the typical band end 335. Thus each band end of the Fig. 21 arrangement has associated therewith a "rat trap" spring 394 having an anchor end 395 thrusting on a lever 342 and the other end 396 thrusting upwardly on a band end as at 335.

We do not limit our invention, in the broader aspects thereof, to any particular combination and arrangement of parts such as shown and described for illustrative purposes since various modifications will be apparent from the teachings of our invention and scope thereof as defined in the appended claims.

What we claim is:

1. In a power transmission for driving a motor vehicle having an engine; a driving shaft adapted to receive drive in a forwardly rotating direction from the engine; a tailshaft adapted to receive drive from the driving shaft for driving the vehicle forwardly or in reverse; speed ratio driving mechanism operably connected to the driving shaft and having a pair of clutch elements adapted to be driven thereby respectively forwardly and reversely; a shiftable clutch member drivingly connected to the tailshaft and adapted for selective clutching with said forwardly and reversely driven clutch elements; said speed ratio mechanism including planetary gearing having a plurality of rotary control elements adapted for engagement to effect predetermined forward speed ratio drives from the driving shaft to said forwardly driven clutch element; devices respectively operable to engage said control elements; pressure fluid operated motors respectively adapted to operate said devices; means controllable for distributing pressure fluid to said motors; a selector element selectively adjustable by the vehicle driver to a plurality of predetermined positions; means operable in response to driver adjustment of said selector element for shifting said shiftable clutch member to effect said selective clutching with said clutch elements; and means operable in response to driver adjustment of said selector element for controlling said pressure fluid distributing means.

2. In a power transmission for driving a motor vehicle having an engine; a driving shaft adapted to receive drive in a forwardly rotating direction from the engine; a tailshaft adapted to receive drive from the driving shaft for driving the vehicle forwardly or in reverse; speed ratio driving mechanism operably connected to the driving shaft and having a power transmitting member thereof adapted to be driven forwardly at a speed less than that of the driving shaft; a forwardly driving clutch element drivingly connected to said power transmitting member; reverse gearing drivingly connected to said power transmitting member and having a reverse drive clutch element driven thereby; a shiftable clutch member drivingly connected to the tailshaft and adapted for selective clutching either with said forwardly driving clutch element or with said reverse drive clutch element; said speed ratio driving mechanism including planetary gearing having a plurality of rotary control elements adapted for engagement to effect predetermined forward speed ratio drives from the driving shaft to said power transmitting member; devices respectively operable to engage said control elements; pressure fluid operated motors respectively adapted to operate said devices; means controllable for distributing pressure fluid to said motors; a selector element selectively adjustable by the vehicle driver to a plurality of predetermined positions; means operable in response to driver adjustment of said selector element for shifting said shiftable clutch member to effect said selective clutching with said clutch elements; and means operable in response to driver adjustment of said selector element for controlling said pressure fluid distributing means.

3. In a power transmission for driving a motor vehicle having an engine; a driving shaft adapted to receive drive in a forwardly rotating direction from the engine; a tailshaft adapted to receive drive from the driving shaft for driving the vehicle forwardly or in reverse; variable speed ratio driving mechanism operably connected to the driving shaft and having a pair of clutch elements adapted to be driven thereby respectively forwardly and reversely; means including a member shiftable to drivingly clutch the tailshaft selectively with said forwardly and reversely driven clutch elements; a selector element selectively adjustable by the vehicle driver to a plurality of predetermined positions; means operable in response to driver adjustment of said selector element for selectively shifting said member; and means operable in response to driver adjustment of said selector element for effecting variation in the drive through said speed ratio driving mechanism.

4. In a power transmission for driving a motor vehicle having an engine; a driving shaft adapted to receive drive in a forwardly rotating direction from the engine; a tailshaft adapted to receive drive from the driving shaft for driving the vehicle forwardly or in reverse; variable speed ratio driving mechanism operably connected to the driving shaft and having a pair of clutch elements adapted to be driven thereby respectively forwardly and reversely; means operable to drivingly clutch the tailshaft selectively with said forwardly and reversely driven clutch elements; a selector element selectively adjustable by the vehicle driver to a plurality of predetermined positions; pressure fluid operated means including a follower piston adapted to selectively operate said clutch means, and a leader valve operable to control pressure fluid operation of said piston; means operable in response to driver adjustment of said selector element for operating said leader valve; and means operable in response to driver adjustment of said selector element for effecting variation in the drive through said speed ratio driving mechanism.

5. In a power transmission for driving a motor vehicle having an engine; a driving shaft adapted to receive drive in a forwardly rotating direction from the engine; a tailshaft adapted to receive drive from the driving shaft for driving the vehicle forwardly or in reverse; variable speed ratio driving mechanism operably connected to the driving shaft and having a pair of clutch elements adapted to be driven thereby respectively forwardly and reversely; means operable to drivingly clutch the tailshaft selectively with said forwardly and reversely driven clutch elements; a selector element selectively adjustable by the vehicle driver to a plurality of predetermined positions; means utilizing the vacuum of the engine intake for selectively operating said clutch means, including, a cylinder, a piston operable within said cylinder and adapted to operate said clutch means, leader valve means adjustable to control vacuum operation of said piston proportionate to adjustment of the leader valve means; and means operable in response to driver adjustment of said selector element for controlling the operation of said vacuum operating means and for effecting variation in the drive through said speed ratio driving mechanism.

6. In a power transmission for driving a motor vehicle having an engine; a driving shaft adapted to receive drive in a forwardly rotating direction from the engine; a driven shaft adapted to receive drive from the driving shaft for driving the vehicle forwardly or in reverse; variable speed ratio gearing between said shafts operable to drive the driven shaft from the driving shaft in a plurality of forwardly driving speed ratios and in reverse; means including a member adapted to be shifted for selectively controlling forward and reverse drive of the driven shaft; and manually controlled pressure fluid operating means for selectively shifting said member, including, a follower operable by pressure fluid, means operably connecting said follower with said member, and leader valve means adapted for manipulation by the vehicle driver to effect pressure fluid operation of said follower.

7. In a power transmission for driving a motor vehicle having an engine; a driving shaft adapted to receive drive in a forwardly rotating direction from the engine; a driven shaft adapted to receive drive from the driving shaft for driving the vehicle forwardly or in reverse; variable speed ratio gearing between said shafts operable to drive the driven shaft from the driving shaft in a plurality of forwardly driving speed ratios and in reverse; selectively operable drive-control-means for said speed ratio gearing; and means utilizing the vacuum of the engine intake for selectively operating said drive-control-means, including, a follower adapted for vacuum operation, and leader valve means adapted for incremental manipulation by the vehicle driver to effect vacuum operation of said follower proportionate to the manipulation of the leader valve means.

8. In a power transmission for driving a motor vehicle having an engine; a driving shaft adapted to receive drive in a forwardly rotating direction from the engine; a driven shaft adapted to receive drive from the driving shaft for driving the vehicle forwardly or in reverse; variable speed ratio gearing between said shafts operable to drive the driven shaft from the driving shaft in a plurality of forwardly driving speed ratios and in reverse; selectively operable drive-control-means for said speed ratio gearing; and pressure fluid operating means for selectively operating said drive-control-means, including, a pressure fluid operated follower-piston for selectively operating said drive-control-means, leader valve means adjustable in opposite directions of movement to effect pressure fluid operation of said follower-piston, a stop adjustable in opposite directions of movement, vehicle driver operated means for adjusting said stop in its said opposite directions of movement, means operated by adjustment of said stop in one of its said directions of movement for adjusting said leader valve means in one of its said directions of movement, and yielding means acting on said leader valve adjusting means for adjusting said leader valve means in the other of its said directions of movement in response to adjustment of said stop in the other of its said directions of movement.

9. In a power transmission for driving a motor vehicle having an engine; a driving shaft adapted to receive drive in a forwardly rotating direction from the engine; a driven shaft adapted to receive drive from the driving shaft for driving the vehicle forwardly or in reverse; variable speed ratio gearing between said shafts operable to drive the driven shaft from the driving shaft in a plurality of forwardly driving speed ratios and in reverse; selectively operable drive-control-means for said speed ratio gearing; pressure fluid operating means for selectively operating said drive-control-means, including, a pressure fluid operated follower-piston for selectively operating said drive-control-means, leader valve means adjustable in opposite directions of movement to effect pressure fluid operation of said follower-piston, a stop adjustable in opposite directions of movement, vehicle driver operated means for adjusting said stop in its said opposite directions of movement, means operated by adjustment of said stop in one of its said directions of movement for adjusting said leader valve means in one of its said said directions of movement, and yielding means acting on said leader valve adjusting means for adjusting said leader valve means in the other of its said directions of movement in response to adjustment of said stop in the other of its said directions of movement; means limiting said adjusting movement of said leader valve means by said yielding means to accommodate overtravel of said stop in said other direction of movement thereof beyond said leader valve adjusting means; and means operable in response to said overtravel of said stop for effecting variation in the drive of said variable speed ratio gearing independently of said pressure fluid operating means.

10. In a power transmission for driving a motor vehicle having an engine; a driving shaft adapted to receive drive in a forwardly rotating direction from the engine; a driven shaft adapted to receive drive from the driving shaft for driving the vehicle forwardly or in reverse; variable speed ratio gearing between said shafts operable to drive the driven shaft from the driving shaft in a plurality of forwardly driving speed ratios and in reverse; means operable to selectively control forward and reverse drive of the driven shaft; power operating means for said forward and reverse drive-control-means; second power operating means for selectively effecting said plurality of forwardly driving speed ratios; independent power sources for the first and second said power operating means; a selector element adjustable by the vehicle driver selectively to a plurality of stations of transmission control respectively for neutral, forward drives, and reverse drive; means operable in response to driver adjustment of said selector element from said neutral station to either of said forward drive stations or to said reverse drive station for effecting operation of the first said power operating means; and means operable in response to driver adjustment of said selector element from said neutral station to either of said forward drive stations for controlling operation of said second power operating means.

11. In a power transmission for driving a motor vehicle having an engine provided with a throttle valve; a driving shaft adapted to receive drive in a forwardly rotating direction from the engine; a tailshaft adapted to receive drive from the driving shaft for driving the vehicle forwardly or in reverse; variable speed ratio driving mechanism operably connected to the driving shaft and having a pair of clutch elements adapted to be driven thereby respectively forwardly and reversely; means operable to drivingly clutch the tailshaft selectively with said forwardly and reversely driven clutch elements; a selector element selectively adjustable by the vehicle driver to a plurality of predetermined positions; means operable in response to driver adjustment of said selector element for selectively operating said clutch means; means operable in response to driver adjustment of said selector element for effecting variation in the drive through said speed ratio driving mechanism; driver operated means for adjusting the engine throttle valve; and means operable in response to driver operation of said throttle valve adjusting means for effecting variation in the drive through said speed ratio driving mechanism.

12. In a power transmission for a motor vehicle having an engine; a driving shaft adapted to receive drive from the engine; a driven shaft adapted to drive the vehicle; variable speed ratio drive mechanism for driving the driven shaft from the driving shaft at a plurality of speed ratios; a plurality of pressure fluid operating means for controlling said speed ratio drives; valving means operable to control pressure fluid supply to said plurality of pressure fluid operating means; a driver operated selector element operable selectively to a plurality of stations of transmission drive control respectively corresponding to said plurality of speed ratio drives; first mechanism operable by said selector element; second mechanism adapted to operate said valving means; yielding means operably connecting said mechanisms to accommodate operation of the second mechanism by the first mechanism and operation of the second mechanism independently of the first mechanism; and means operable by the vehicle driver for operating the second mechanism independently of the first mechanism to operate said valving means.

13. In a power transmission for a motor vehicle having an engine provided with a throttle valve; a driving shaft adapted to receive drive from the engine; a driven shaft adapted to drive the vehicle; variable speed ratio drive mechanism for driving the driven shaft from the driving shaft at a plurality of speed ratios; a plurality of pressure fluid operating means for controlling said speed ratio drives; valving means operable to control pressure fluid supply to said plurality of pressure fluid operating means; a driver operated selector element operable selectively to a plurality of stations of transmission drive control respectively corresponding to said plurality of speed ratio drives; first mechanism operable by said selector element; second mechanism adapted to operate said valving means; yielding means operably connecting said mechanisms to accommodate operation of the second mechanism by the first mechanism and operation of the second mechanism independently of the first mechanism; driver operated means for adjusting the engine throttle valve; and means operable in response to driver operation of said throttle valve adjusting means for operating the second mechanism independently of the first mechanism to operate said valving means.

14. In a power transmission for driving a motor vehicle having an engine provided with a throttle valve; a driving shaft adapted to receive drive from the engine; a driven shaft adapted to drive the vehicle; variable speed ratio driving mechanism including a pair of pressure fluid operated devices for effecting drive of the driven shaft from the driving shaft at two relatively different speed ratios; distributor valve means operable to supply fluid under pressure either to one or to both of said devices for respectively controlling said speed ratio drives; driver controlled means for operating said valve means; driver operated means for adjusting the engine throttle valve; and means for operating said valve means in response to operation of said throttle valve adjusting means.

15. In a power transmission for driving a motor vehicle having an engine provided with a throttle valve; a driving shaft adapted to receive drive from the engine; a driven shaft adapted to drive the vehicle; variable speed ratio driving mechanism including a pair of pressure fluid operated devices for effecting drive of the driven shaft from the driving shaft at two relatively different speed ratios; distributor valve means operable to supply fluid under pressure to said devices for controlling said speed ratio drives; a driver operated selector element; driver operated means operable throughout a first range of travel for adjusting the engine throttle valve to the limit of its throttle opening position and operable therebeyond in a second range of travel; means for operating said distributor valve means in response to operation of said selector element; and means for operating said distributor valve in response to operation of said throttle valve adjusting means in said second range of travel.

16. In a power transmission for driving a motor vehicle having an engine provided with a throttle valve; a driving shaft adapted to receive drive from the engine; a driven shaft adapted to drive the vehicle; variable speed ratio driving mechanism including a pair of pressure fluid operated devices for effecting drive of the driven shaft from the driving shaft at two relatively different speed ratios; a distributor valve operable to supply fluid under pressure to said devices for controlling said speed ratio drives; a selector element operable by the vehicle driver selectively to either of a pair of stations of transmission drive control respectively corresponding to said speed ratio drives; means for operating said distributor valve in response to selective operation of said selector element; driver operated means for adjusting the engine throttle valve; and means for operating said distributor valve in response to operation of said throttle valve adjusting means only when said selector element is positioned at one of said stations corresponding to the faster of said speed ratio drives to drive the vehicle at the slower of said speed ratio drives.

17. In a power transmission for driving a motor vehicle having an engine provided with a throttle valve; a driving shaft adapted to receive drive from the engine; a driven shaft adapted to drive the vehicle; variable speed ratio driving mechanism including a pair of pressure fluid operated devices for effecting drive of the driven shaft from the driving shaft at two relatively different speed ratios; distributor valve means operable to supply fluid under pressure to said devices for controlling said speed ratio drives; a selector element operable by the vehicle driver selectively to either of a pair of stations of transmission drive control respectively corresponding to said speed ratio drives; means for operating said distributor valve means in response to selective operation of said selector element; an accelerator pedal; means operably connecting said pedal with the engine throttle valve accommodating overtravel of the pedal beyond its wide-open throttle position; and means for operating said distributor valve means in response to overtravel of said pedal when said selector element is positioned at one of said stations corresponding to the faster of said speed ratio drives to drive the vehicle at the slower of said speed ratio drives.

18. In a power transmission for a motor vehicle; a plurality of control elements adapted to control selective speed ratio drives through the transmission; a plurality of speed ratio controlling devices respectively engageable with said control elements; a plurality of pressure fluid operated means respectively adapted to operate said speed ratio controlling devices; primary control means for effecting selective variation of said speed ratio drives at the will of the driver, including, a valve operable in opposite directions of movement to control pressure fluid supply to said plurality of pressure fluid operated means, and a driver operated selector element adjustable to a plurality of predetermined positions respectively corresponding to said speed ratio drives, and means operably connecting said selector element with said valve for moving the valve in its said opposite directions of movement in response to adjustment of the selector element; and driver operated secondary control means for operating said valve to effect a change in the transmission drive from one drive speed ratio which at such time is provided in accordance with the position of said selector element to another drive speed ratio independently of selective adjustment of said selector element.

19. In a drive for a motor vehicle having an engine provided with a throttle valve actuator operable by the driver throughout a range of movement in adjusting the throttle valve between its extreme limits of opening and closing positions, means accommodating driver operation of said actuator throughout its said range of movement and therebeyond, a transmission having a plurality of speed ratio controlling devices adapted to selectively control speed ratio drives from the engine to the vehicle, means operable by the driver for effecting selective operation of said devices, the last said means including an adjustable pressure fluid distributing valve, and means operable in response to operation of said throttle valve actuator beyond its said range of movement for adjusting said valve to effect change in the operation of said devices to vary the speed ratio drive.

20. In a drive for a motor vehicle having an engine provided with a throttle valve actuator operable by the driver throughout a range of movement in adjusting the throttle valve between its extreme limits of opening and closing positions, means accommodating driver operation of said actuator throughout its said range of movement and therebeyond, a transmission for driving the vehicle from the engine in a plurality of variable speed ratio drives, means providing a drive through the transmission, means providing an additional drive through the transmission faster than that provided by the first said drive means, a pressure fluid motor operable to control said faster drive means, a source of liquid, means including a pump for supplying said liquid under pressure from said source to said motor, a valve controlling said liquid supplying means, driver controlled means for operating said valve to effect said faster drive, and means operable in response to operation of said throttle valve actuator beyond its said range of movement for operating said valve to shut off said pressure liquid supply from said pump to said motor.

21. In a motor vehicle planetary gear transmission having driving and driven shafts; means for driving the driven shaft from the driving shaft at a speed different than that of the driving shaft; said driving means including a planet gear and carrier member therefor, a sun gear member meshing with said planet gear, and an annulus gear member meshing with said planet gear; said sun gear member being drivingly connected with the driving shaft and said carrier member being drivingly connected with the driven shaft; a rotatable reaction-taking element; a control pedal operable by the vehicle driver from a position of maximum upward release to a position of maximum downward operation; releasable braking means operating to hold said reaction-taking element against rotation when said pedal is in its said position of maximum upward release; means operable in response to operation of said pedal from its said position of maximum upward release to its said position of maximum downward operation for effecting release of said braking means; and overrunning control means operable between said reaction-taking element and said annulus gear member to automatically prevent rotation of said remainder member in the direction of rotational tendency thereof caused by drive of said sun gear member when said pedal is in its said position of maximum upward release whereby said driven shaft is driven from said driving shaft at said different speed.

22. In a power transmission for a motor vehicle having an engine; a driving shaft adapted to be driven from the engine; a fluid coupling operably connecting the engine with the driving shaft; a driven shaft adapted to drive the vehicle; speed ratio driving mechanism for operably connecting said shafts to drive the driven shaft from the driving shaft at a plurality of forwardly driving relatively different speed ratios; said mechanism including: a control device normally operating to effect the slowest of said speed ratio drives and adapted to be rendered inoperative to release the drive from the engine and fluid coupling to the driven shaft through this slowest speed ratio drive, and a plurality of normally inoperative control devices adapted for operation to effect other of said speed ratio drives; a selector element operable by the vehicle driver selectively to a plurality of drive controlling positions; means operable in response to driver operation of said selector element for effecting operation of said normally inoperative control devices; a control element operable by the vehicle driver; and means operable in response to driver operation of said control element for rendering said normally operating control device inoperative.

23. In a power transmission for a motor vehicle having an engine; a driving shaft adapted to be driven from the engine; a fluid coupling operably connecting the engine with the driving shaft; a driven shaft adapted to drive the vehicle; speed ratio driving mechanism for operably connecting said shafts to drive the driven shaft from the driving shaft at a plurality of forwardly driving relatively different speed ratios; said mechanism including: a control device normally operating to effect the slowest of said speed ratio drives and adapted to be rendered inoperative to release the drive from the engine and fluid coupling to the driven shaft through this slowest speed ratio drive, and a plurality of normally inoperative control devices adapted for operation to effect other of said speed ratio drives; a selector element operable by the vehicle driver selectively to a plurality of drive controlling positions; means operable in response to driver operation of said selector element for effecting operation of said normally inoperative control devices; a pedal operable by the vehicle driver; and means operable in response to driver operation of said pedal for rendering said normally operating control device inoperative.

24. In a power transmission for a motor vehicle having an engine; a driving shaft adapted to be driven from the engine; a driven shaft adapted to drive the vehicle; speed ratio driving mechanism for operably connecting said shafts to drive the driven shaft from the driving shaft at a plurality of forwardly driving relatively different speed ratios; said mechanism including: a control device normally operating to effect the slowest of said speed ratio drives and adapted to be rendered inoperative to release the drive from the engine to the driven shaft through this slowest speed ratio drive, and a plurality of normally inoperative control devices adapted for operation to effect other of said speed ratio drives; a selector element operable by the vehicle driver selectively to a plurality of drive controlling positions; means operable in response to driver operation of said selector element for effecting operation of said normally inoperative control devices; a control element operable by the vehicle driver; and means operable in response to driver operation of said control element for rendering said normally operating control device inoperative.

25. In a power transmission for a motor vehicle having an engine; a driving shaft adapted to be driven from the engine; a fluid coupling operable connecting the engine with the driving shaft; a driven shaft adapted to drive the vehicle; speed ratio driving mechanism for operably connecting said shafts to drive the driven shaft from the driving shaft at a plurality of forwardly driving relatively different speed ratios; said mechanism including: a control device normally operating to effect the slowest of said speed ratio drives and adapted to be rendered inoperative to release the drive from the engine and fluid coupling to the driven shaft through this slowest speed ratio drive, and a plurality of normally inoperative control devices adapted for operation to effect other of said speed ratio drives; a selector element operable by the vehicle driver selectively to a plurality of drive controlling positions; means operable in response to driver operation of said selector element for effecting operation of said normally inoperative control devices; a control element operable by the vehicle driver; means operable in response to driver operation of said control element for rendering said normally operating control device inoperative; a tailshaft adapted to be driven from the driven shaft; and means including a clutch operable when said normally operating control device is rendered inoperative to establish direct drive relationship between the driven shaft and the tailshaft.

26. In a power transmission for a motor vehicle having an engine; a driving shaft adapted to be driven from the engine; a fluid coupling operably connecting the engine with the driving shaft; a driven shaft adapted to drive the vehicle; speed ratio driving mechanism for operably connecting said shafts to drive the driven shaft from the driving shaft at a plurality of forwardly driving relatively different speed ratios; said mechanism including: a control device normally operating to effect the slowest of said speed ratio drives and adapted to be rendered inoperative to release the drive from the engine and fluid coupling to the driven shaft through this slowest speed ratio drive, and a plurality of normally inoperative control devices adapted for operation to effect other of said speed ratio drives; a selector element operable by the vehicle driver selectively to a plurality of drive controlling positions; means operable in response to driver operation of said selector element for effecting operation of said normally inoperative control devices; a pedal operable by the vehicle driver; and means operable in response to driver operation of said pedal for rendering said normally operating control device inoperative; a tailshaft adapted to be driven from the driven shaft; and means including a clutch operable when said normally operating control device is rendered inoperative to establish direct drive relationship between the driven shaft and the tailshaft.

27. In a power transmission for driving a motor vehicle having an engine; a driving shaft adapted to receive drive in a forwardly rotating direction from the engine; a tailshaft adapted to receive drive from the driving shaft for driving the vehicle forwardly or in reverse; speed ratio driving mechanism operably connected to the driving shaft and having a pair of clutch elements adapted to be driven thereby respectively forwardly and reversely; a shiftable clutch member drivingly connected to the tailshaft and adapted for selective clutching with said forwardly and reversely driven clutch elements; said speed ratio mechanism including planetary gearing for driving said forwardly driven clutch element from the driving shaft at two relatively different forward driving speed ratios, said planetary gearing having a pair of rotary control members; overrunning means operable automatically to prevent rotation of one of said control members in one direction for effecting the slower of said speed ratio drives; pressure fluid operable means adapted to act on the other of said control members for effecting the faster of said speed ratio drives; driver controlled operating means for shifting said shiftable clutch member to selectively clutch with said clutch elements thereby effecting drive from the driving shaft selectively to said clutch elements through the slower of said speed ratio drives; means responsive to operation of said driver controlled operating means for supplying pressure fluid to said fluid operable means; said overrunning means permitting rotation of the first said control member in a direction opposite to the aforesaid rotation thereof during said faster drive; and means operable by the vehicle driver for rendering said overrunning means ineffective to thereby prevent said slower speed ratio drive and facilitate selective clutching of said shiftable clutch member.

28. In a power transmission for driving a motor vehicle having an engine; a driving shaft adapted to be driven by the engine; a driven shaft adapted to drive the vehicle; change speed mechanism including means for driving the driven shaft from the driving shaft at a relatively slow speed and means for driving the driven shaft from the driving shaft at speed relatively faster than that provided by said relatively slow speed driving means; pressure fluid operated means for effecting operation of said relatively fast driving means; fluid pumping means for delivering pressure fluid to said fluid operated means; means for driving said fluid pumping means independently of the engine so that in stopping the vehicle with the engine running the pressure of the fluid will drop below that required to operate said fluid operated means; control means for said relatively slow speed driving means operating to effect this drive independently of said fluid pumping means for starting the vehicle, said control means operating to release the relatively slow speed drive in response to operation of the relatively fast speed drive to accommodate a step-up in the drive through said change speed mechanism when said fluid pumping means operates to restore the pressure of the fluid after the vehicle is started; driver operable means to render said control means ineffective to effect said relatively slow speed driving means thereby to disconnect the driven shaft from the driving shaft; a tailshaft adapted to be driven from the driven shaft; and means including a clutch operable when said control means is rendered ineffective to establish direct drive relationship between the driven shaft and the tailshaft.

29. In a power transmission for driving a motor vehicle having an engine; a driving shaft adapted to be driven by the engine; a driven shaft adapted to drive the vehicle; change speed mechanism including means for driving the driven shaft from the driving shaft at a relatively slow speed and means for driving the driven shaft from the driving shaft at different speeds relatively faster than that provided by said relatively slow speed driving means; preselective operating means controlled by the vehicle driver for effecting operation of said relatively faster speed driving means for driving the vehicle selectively in one of said different speeds in response to acceleration of the vehicle from a position of rest; means operable by the vehicle driver, when said preselective means is set to effect operation of the faster of said different speed drives, for controlling the operation of said preselective means to selectively effect either operation of the slower or the faster of said different speed drives; and control means for said relatively slow speed driving means operable to effect this drive, independently of said preselective operating means and said driver operable controlling means, and to release this drive in response to operation of either of said relatively fast speed driving means.

30. In a power transmission for driving a motor vehicle having an engine; a driving shaft adapted to be driven by the engine; a driven shaft adapted to drive the vehicle; change speed mechanism including means for driving the driven shaft from the driving shaft at a relatively slow speed and means for driving the driven shaft from the driving shaft at different speeds relatively faster than that provided by said relatively slow speed driving means; preselective pressure fluid operating means controlled by the vehicle driver for effecting operation of said relatively faster speed driving means for driving the vehicle selectively in one of said different speed drives in response to acceleration of the vehicle from a position of rest, said pressure fluid operating means including fluid pressure-generating means dependent in fluid pressure generation upon movement of the vehicle; means operable by the vehicle driver, when said preselective means is set to effect operation of the faster of said different speed drives, for controlling the operation of said preselective means to selectively effect either operation of the slower or the faster of said different speed drives; and control means for said relatively slow speed driving means operable to effect this drive independently of said fluid pressure-generating means and to release this drive in response to operation of either of said relatively fast speed driving means.

31. In a power transmission for driving a motor vehicle having an engine; a driving shaft adapted to be driven by the engine; a driven shaft adapted to drive the vehicle; change speed mechanism including means for driving the driven shaft from the driving shaft at a relatively slow speed and means for driving the driven shaft from the driving shaft at two speeds relatively different from and faster than that provided by said relatively slow speed driving means; a pair of pressure fluid operating means respectively adapted to effect operation of said two relatively fast driving means; fluid pumping means for delivering pressure fluid to said pair of fluid operated means; means for driving said fluid pumping means independently of the engine so that in stopping the vehicle with the engine running the pressure of the fluid will drop below that required to operate said pair of fluid operated means; control means for said relatively slow speed driving means operating to effect this drive independently of said fluid pumping means for starting the vehicle, said control means operating to release the relatively slow speed drive in response to operation of either of said relatively fast speed drives to accommodate step-up in the drive through said change speed mechanism when said fluid pumping means operates to restore the pressure of the fluid after the vehicle is started; preselective pressure fluid distributing means controlled by the vehicle driver for controlling pressure fluid distribution from said pumping means to said pair of pressure fluid operated means to effect selective operation of said two relatively faster driving means; and means operable by the vehicle driver, when said preselective means is set to effect operation of the faster of said two relatively faster driving means, for controlling operation of said preselective pressure fluid distributing means to selectively effect either operation of the slower or the faster of said two relatively faster driving means.

32. In a power transmission for driving a motor vehicle having an engine; a driving shaft adapted to be driven by the engine; a driven shaft adapted to drive the vehicle; change speed mechanism including means for driving the driven shaft from the driving shaft at a relatively slow speed and means for driving the driven shaft from the driving shaft at two speeds relatively different from and faster than that provided by said relatively slow speed driving means; a pair of pressure fluid operating means respectively adapted to effect operation of said two relatively fast driving means; fluid pumping means for delivering pressure fluid to said pair of fluid operated means; means for driving said fluid pumping means independently of the engine so that in stopping the vehicle with the engine running the pressure of the fluid will drop below that required to operate said pair of fluid operated means; control means for said relatively slow speed driving means operating to effect this drive independently of said fluid pumping means for starting the vehicle, said control means operating to release the relatively slow speed drive in response to operation of either of said relatively fast speed drives to accommodate step-up in the drive through said change speed mechanism when said fluid pumping means operates to restore the pressure of the fluid after the vehicle is started; preselective pressure fluid distributing means controlled by the vehicle driver for selectively opening either one or both of said pair of fluid operated means to said fluid pumping means to respectively effect selective operation of either the slower or the faster of said two relatively faster driving means; and means operable by the vehicle driver, when said preselective means is set to effect operation of the faster of said two relatively faster driving means, for controlling operation of said preselective pressure fluid distributing means to selectively effect either operation of the slower or the faster of said two relatively faster driving means.

33. In a power transmission for driving a motor vehicle having an engine; a driving shaft adapted to be driven by the engine; a driven shaft adapted to drive the vehicle; change speed mechanism including means for driving the driven shaft from the driving shaft at a relatively slow speed and means for driving the driven shaft from the driving shaft at two speeds relatively different from and faster than that provided by said relatively slow speed driving means; a pair of pressure fluid operating means respectively adapted to effect operation of said two relatively fast driving means; fluid pumping means for delivering pressure fluid to said pair of fluid operated means; means for drivingly connecting said fluid pumping means with the driven shaft; means operable by the vehicle driver for effecting disconnection of the driven shaft from the driving shaft whereby the engine may operate with the vehicle and the driven shaft at rest; pressure fluid distributing means operable to control pressure fluid distribution from said pumping means to said pair of pressure fluid operated means to effect selective operation of said two relatively faster driving means; a plurality of independently operable driver-controlling means for operating said pressure fluid distributing means; and control means operable to provide said relatively slow speed drive independently of said fluid pumping means and to release this drive in response to operation of either of said two relatively faster driving means.

34. In a power transmission for driving a motor vehicle having an engine; a driving shaft adapted to be driven by the engine; a driven shaft adapted to drive the vehicle; change speed mechanism including means for driving the driven shaft from the driving shaft at a relatively slow speed and means for driving the driven shaft from the driving shaft at two speeds relatively different from and faster than that provided by said relatively slow speed driving means; a plurality of drive controlling means each adapted for selective manipulation by the vehicle driver independently of the other and each operable in response to acceleration of the vehicle from a position of vehicle rest to effect selective operation of said two relatively faster driving means; means operable to establish or release driving connection between the driving and driven shafts through said change speed mechanism; and control means for said relatively slow speed driving means operating to effect this drive independently of said plurality of driver manipulated drive controlling means upon establishment of driving connection between the driving and driven shafts and to release said relatively slow speed driving means in response to operation of either of said two relatively faster speed driving means.

35. In a power transmission for driving a motor vehicle having an engine; a driving shaft adapted to be driven by the engine; a driven shaft adapted to drive the vehicle; change speed mechanism including means for driving the driven shaft from the driving shaft at a relatively slow speed and means for driving the driven shaft from the driving shaft at two speeds relatively different from and faster than that provided by said relatively slow speed driving means; preselective pressure fluid operating means controlled by the vehicle driver for effecting selective operation of said two relatively faster driving means in response to acceleration of the vehicle from a position of rest; drive controlling means operable by the vehicle driver for modifying the operation of said preselective pressure fluid operating means, when the latter is set for operation of the faster of said two relatively faster driving means, to effect operation of the slower of said two relatively faster driving means; and control means for said relatively slow speed driving means operable to effect this drive independently of said preselective operating means and to release this drive in response to operation of either of said relatively faster speed driving means.

36. In a power transmission for driving a motor vehicle having an engine; a driving shaft adapted to be driven by the engine; a driven shaft adapted to drive the vehicle; change speed mechanism including means for driving the driven shaft from the driving shaft at a relatively slow speed and means for driving the driven shaft from the driving shaft at two speeds relatively different from and faster than that provided by said relatively slow speed driving means; preselective pressure fluid operating means controlled by the vehicle driver for effecting selective operation of said two relatively faster driving means in response to acceleration of the vehicle from a position of rest; drive controlling means operable by the vehicle driver for modifying the operation of said preselective pressure fluid operating means, when the latter is set for operation of the faster of said two relatively faster driving means, to effect operation of the slower of said two relatively faster driving means; said pressure fluid operating means including pressure-generating means dependent in pressure fluid generation upon movement of the vehicle; means for driving said fluid pressure-generating means at a predetermined fixed speed ratio with respect to the speed of forward travel of the vehicle; and control means for said relatively slow speed driving means operable to effect this drive independently of said pressure-generating means and to release this drive in response to operation of either of said relatively faster speed driving means.

37. In a power transmission for driving a motor vehicle having an engine; a driving shaft adapted to be driven by the engine; a driven shaft adapted to drive the vehicle; change speed mechanism including means for driving the driven shaft from the driving shaft at a relatively slow speed and means for driving the driven shaft from the driving shaft at two speeds relatively different from and faster than that provided by said relatively slow speed driving means; a pair of pressure fluid operating means respectively adapted to effect operation of said two relatively fast driving means; fluid pumping means for delivering pressure fluid to said pair of fluid operated means; means for drivingly connecting said fluid pumping means with the driven shaft; means operable by the vehicle driver for effecting disconnection of the driven shaft from the driving shaft whereby the engine may operate with the vehicle and the driven shaft at rest; pressure fluid distributing means operable to control pressure fluid distribution from said pumping means to said pair of pressure fluid operated means to effect selective operation of said two relatively faster driving means; a plurality of independently operable driver-controlling means for operating said pressure fluid distributing means; control means operable to provide said relatively slow speed drive independently of said fluid pumping means and to release this drive in response to operation of either of said two relatively faster driving means; and means for regulating the rate of pressure fluid delivery from the fluid pumping means to said pair of pressure fluid operated means for controlling the operation of the relatively faster driving means during initial acceleration of the vehicle.

38. In a power transmission for driving a motor vehicle having an engine; a driving shaft adapted to be driven by the engine; a driven shaft adapted to drive the vehicle; change speed mechanism including means for driving the driven shaft from the driving shaft at a relatively slow speed and means for driving the driven shaft from the driving shaft at two speeds relatively different from and faster than that provided by said relatively slow speed driving means; preselective pressure fluid operating means controlled by the vehicle driver for effecting selective operation of said two relatively faster driving means in response to acceleration of the vehicle from a position of rest; drive controlling means operable by the vehicle driver for modifying the operation of said preselective pressure fluid operating means, when the latter is set for operation of the faster of said two relatively faster driving means, to effect operation of the slower of said two relatively faster driving means; said pressure fluid operating means including pressure-generating means dependent in pressure fluid generation upon movement of the vehicle; control means for said relatively slow speed driving means operable to effect this drive independently of said pressure-generating means and to release this drive in response to operation of either of said relatively faster speed driving means; and regulatable means for venting said pressure-generating means thereby to vary the rate of pressure fluid build-up during initial acceleration of the vehicle.

39. In a power transmission for driving a motor vehicle having an engine provided with a throttle valve; an accelerator pedal adapted to be depressed by the vehicle driver; means operably connecting the accelerator pedal with the engine throttle valve accommodating depressed overtravel of the pedal beyond its wide-open throttle position; a driving shaft adapted to receive drive from the engine; a driven shaft adapted to drive the vehicle; change speed mechanism including means for driving the driven shaft from the driving shaft at a relatively slow speed and means for driving the driven shaft from the driving shaft at two relatively different speeds faster than that provided by said relatively slow speed driving means; a pair of fluid pressure operated motors respectively operably associated with said relatively faster driving means for effecting operation thereof; distributor valve means adjustable to control distribution of fluid under pressure to said motors for selectively effecting operation of said two relatively faster driving means; means for supplying fluid under pressure to said distributor valve means; vehicle driver manipulated means for adjusting said distributor valve means to effect operation of either the slower or the faster of said two relatively faster driving means; means operable in response to said depressed overtravel of the accelerator pedal, when said distributor valve means is adjusted to effect operation of the faster of said relatively faster driving means, for adjusting said distributor valve means to effect operation of the slower of said relatively faster driving means; and control means for said relatively slow speed driving means operable to effect this drive independently of said pressure fluid supplying means.

40. In a power transmission for driving a motor vehicle having an engine provided with a throttle valve; an accelerator pedal adapted to be depressed by the vehicle driver; means operably connecting the accelerator pedal with the engine throttle valve accommodating depressed overtravel of the pedal beyond its wide-open throttle position; a driving shaft adapted to receive drive from the engine; a driven shaft adapted to drive the vehicle; change speed mechanism including means for driving the driven shaft from the driving shaft at a relatively slow speed and means for driving the driven shaft from the driving shaft at two relatively different speeds faster than that provided by said relatively slow speed driving means; a pair of fluid pressure operated motors respectively operably associated with said relatively faster driving means for effecting operation thereof; distributor valve means adjustable to control distribution of fluid under pressure to said motors for selectively effecting operation of said two relatively faster driving means; means for supplying fluid under pressure to said distributor valve means; vehicle driver manipulated means for adjusting said distributor valve means to effect operation of either the slower or the faster of said two relatively faster driving means; means operable in response to said depressed overtravel of the accelerator pedal, when said distributor valve means is adjusted to effect operation of the faster of said relatively faster driving means, for adjusting said distributor valve means to effect operation of the slower of said relatively faster driving means; and overrunning control means operable to provide said relatively slow speed driving means independently of said pressure fluid supplying means and to release this drive in response to operation of either of said relatively faster speed driving means.

41. In a power transmission for driving a motor vehicle having an engine provided with a throttle valve; an accelerator pedal adapted to be depressed by the vehicle driver; means operably connecting the accelerator pedal with the engine throttle valve accommodating depressed overtravel of the pedal beyond its wide-open throttle position; a driving shaft adapted to receive drive from the engine; a driven shaft adapted to drive the vehicle; change speed mechanism including means for driving the driven shaft from the driving shaft at a relatively slow speed and means for driving the driven shaft from the driving shaft at two relatively different speeds faster than that provided by said relatively slow speed driving means; a pair of fluid pressure operated motors respectively operably associated with said relatively faster driving means for effecting operation thereof; distributor valve means adjustable to control distribution of fluid under pressure either to one of said motors or simultaneously to both of said motors for selectively effecting operation of said two relatively faster driving means; means for supplying fluid under pressure to said distributor valve means; vehicle driver manipulated means for adjusting said distributor valve means to effect operation of either the slower or the faster of said two relatively faster driving means; means operable in response to said depressed overtravel of the accelerator pedal, when said distributor valve means is adjusted to effect operation of the faster of said relatively faster driving means, for adjusting said distributor valve means to effect operation of the slower of said relatively faster driving means; and control means for said relatively slow speed driving means operable to effect this drive independently of said pressure fluid supplying means.

42. In a power transmission for driving a motor vehicle having an engine; a driving shaft adapted to receive drive from the engine; a driven shaft adapted to drive the vehicle; speed ratio gearing operable to drive the driven shaft from the driving shaft at a speed different from that of the driving shaft, said speed ratio gearing including a rotatable control element adapted to be held against rotation in one direction to take the reaction of said speed different drive; a rotatable structure adapted to be braked; overrunning means between said control element and said rotatable structure operable to hold said control element as aforesaid when said rotatable structure is braked; braking means for holding said rotatable structure against operation; spring loading means normally operating to apply said braking means; and vehicle driver operated pressure fluid pumping means for unloading said spring means to release said braking means.

43. In a motor vehicle power transmission having driving and driven shafts; planetary gearing for operably connecting said shafts, including, a rotatable control drum; a casing structure for said planetary gearing; a contractible brake band surrounding the drum; a spring disposed adjacent the drum; means operably connecting each end of said spring with one end of said brake band, said spring acting to urge said band ends together to brake the drum; said band having a projection thereof anchored to said casing structure; yielding means acting between said casing structure and said band projection for supporting said band; and vehicle driver controlled means for releasing said band to accommodate rotation of the drum.

44. In a motor vehicle power transmission having driving and driven shafts; planetary gearing for operably connecting said shafts, including, a rotatable control drum; a casing structure for said planetary gearing; a contractible brake band surrounding the drum; a spring disposed adjacent the drum; means operably connecting each end of said spring with one end of said brake band, said spring acting to urge said band ends together to brake the drum; said band having a projection thereof anchored to said casing structure; yielding means acting between each of said band ends and an associated spring connecting means for supporting said band; and vehicle driver controlled means for releasing said band to accommodate rotation of the drum.

45. In a power transmission for driving a motor vehicle having an engine; a driving shaft adapted to receive drive from the engine; a driven shaft adapted to drive the vehicle; speed ratio gearing operable to drive the driven shaft from the driving shaft at a speed different from that of the driving shaft, said speed ratio gearing including a rotatable control element adapted to be held against rotation in one direction to take the reaction of said speed different drive; a rotatable cylinder concentric with the rotational axis of said control element and having a series of circumferentially spaced axially projecting tongues; overrunning means between said control element and said cylinder; a brake member having an annular spider formed with a series of circumferentially spaced radially extending tongues respectively fitting the spaces between the tongues of said cylinder for connecting said cylinder and brake member together, the tongues of said cylinder and spider being grooved; a snap ring disposed in the grooves of said tongues for locking said cylinder and brake member against relative axial movement thereof; and releasable braking means for said brake member.

46. In a planetary transmission for an engine driven motor vehicle having a throttle-valve-controlling accelerator pedal adapted for manipulation by the vehicle driver; planetary gearing having rotatable control elements driven thereby; a pair of friction devices respectively adapted to engage said control elements to vary the drive through the transmission by effecting a change from a relatively slow drive to a relatively fast drive; and means for effecting pressure fluid operation of said friction devices, including, a selector element adjustable by the driver from a transmission control station corresponding to said relatively slow drive to a second station corresponding to said relatively fast drive; a distributor valve for controlling a supply of fluid under pressure to operate said friction devices by power, and means operably connecting the accelerator pedal and the selector element with said distributor valve for joint control of said distributor valve by this pedal and element independently of the speed at which the vehicle is travelling such that driver adjustment of the selector element from the first said control station to the second control station will either thereupon effect said pressure fluid supply or provide a presetting influence on the distributor valve so that said pressure fluid supply will be delayed until the driver manipulates the accelerator pedal.

47. In a planetary transmission for an engine driven motor vehicle having a throttle-valve-controlling accelerator pedal adapted for manipulation by the vehicle driver within a range of throttle valve adjustment and therebeyond for overtravelling the throttle valve; planetary gearing having rotatable control elements driven thereby; a pair of friction devices respectively adapted to engage said control elements to vary the drive through the transmission by effecting a change from a relatively slow drive to a relatively fast drive; and means for effecting pressure fluid operation of said friction devices, including, a selector element adjustable by the driver from a transmission control station corresponding to said relatively slow drive to a second station corresponding to said relatively fast drive, valving means for controlling a supply of fluid under pressure to operate said friction devices by power, and means operably connecting the accelerator pedal and the selector element with said valving means for joint control of said valving means by this pedal and element such that driver adjustment of the selector element from the first said control station to the second control station will either thereupon effect said pressure fluid supply with the accelerator pedal positioned within the range of throttle valve adjustment or provide a presetting influence on the valving means with the accelerator pedal positioned for overtravelling the throttle valve so that said pressure fluid supply will be delayed until the driver manipulates the accelerator pedal within the range of throttle valve adjustment.

48. In a planetary transmission for an engine driven motor vehicle having a throttle-valve-controlling accelerator pedal adapted for manipulation by the vehicle driver within a range of throttle valve adjustment and therebeyond for overtravelling the throttle valve; planetary gearing having rotatable control elements driven thereby; a pair of friction devices respectively adapted to engage said control elements to vary the drive through the transmission by effecting a change from a relatively slow drive to a relatively fast drive; a selector element adjustable by the driver from a position of control corresponding to said relatively slow drive to a second position of control corresponding to said relatively fast drive; and means operable in response to driver adjustment of said selector element and driver manipulation of said accelerator pedal for effecting power engagement of said friction devices respectively with said control elements to effect the aforesaid transmission drive change either in direct response to driver adjustment of said selector element when the accelerator pedal is manipulated within the range of throttle adjustment or subsequently to driver adjustment of said selector element when the accelerator pedal is manipulated to overtravel the throttle valve and in response to manipulation of said accelerator pedal within the range of throttle adjustment.

49. In a power transmission for a motor vehicle having an engine; a driving shaft adapted to be driven from the engine; a fluid coupling operably connecting the engine with the driving shaft; a driven shaft adapted to drive the vehicle; speed ratio driving mechanism for operably connecting said shafts to drive the driven shaft from the driving shaft at a plurality of forwardly driving relatively different speed ratios; said mechanism including: a control device normally operating to effect the slower of said speed ratio drives and adapted to be rendered inoperative to release the drive from the engine and fluid coupling to the driven shaft through this slower speed ratio drive, and means normally inoperative for effecting the faster of said speed ratio drives; a pedal operable by the vehicle driver; and means operable in response to driver operation of said pedal for rendering said normally operating control device inoperative.

50. In a drive for a motor vehicle having an engine provided with a throttle actuator operable by the driver throughout a range of movement in adjusting the throttle between its limits of opening and closing positions; means accommodating driver operation of said actuator throughout its said range of movement to the limit of its throttle opening movement and therebeyond; transmission mechanism operable to provide a plurality of speed ratio drives from the engine to the vehicle, said mechanism including a control device movable between positions of drive control; a driver operable selector element; and means operably connected to said movable control device for effecting movement thereof in response to driver operation of said selector element and in response to driver operation of said throttle actuator beyond its said limit of throttle opening movement to change the speed ratio drive.

51. In a drive for a motor vehicle having an engine provided with a throttle actuator operable by the driver throughout a range of movement in adjusting the throttle between its limits of opening and closing positions, means accommodating driver operation of said actuator from its throttle closing position to the limit of its throttle opening position and therebeyond, transmission mechanism operable to provide at least three forward drives of relatively different predetermined fixed speed ratio from the engine to the vehicle, pressure fluid operated means for controlling at least the fastest of said drives, operating means for controlling another of said three drives by the pressure fluid, operating means for controlling the remainder of said three drives independently of the pressure fluid, means operable in response to operation of said throttle actuator beyond the limit of its said throttle opening position for effecting control of the operation of said pressure fluid operated means to step-down the speed ratio drive, said step-down control means being so arranged as not to change the transmission drive in either of the other two of said three drives, and means operable to effect operation and release of said other two drives independently of operation of said step-down control means as aforesaid.

52. In a drive for a motor vehicle having an engine provided with a throttle valve actuator operable by the driver throughout a range of movement in adjusting the throttle valve between its extreme limits of opening and closing positions, means accommodating driver operation of said actuator throughout its said range of movement and therebeyond, transmission means having a plurality of driving means of predetermined fixed speed ratio operable between the engine and vehicle to provide a relatively slow speed ratio drive and a pair of relatively different speed ratio drives each faster than said relatively slow drive, and change speed means operable in response to operation of said throttle valve actuator beyond its said range of movement for effecting change in the drive through said transmission means from the faster of said pair of drives to another of said drives, said transmission means including a control device automatically operating to provide the relatively slow speed ratio drive in response to release of either the faster or the slower of said pair of drives and adapted to automatically release this relatively slow speed ratio drive in response to operation of either the faster or the slower of said pair of drives.

53. In a drive for a motor vehicle having an engine provided with a throttle valve actuator operable by the driver throughout a range of movement in adjusting the throttle valve between its extreme limits of opening and closing positions, means accommodating driver operation of said actuator throughout its said range of movement and therebeyond, transmission means having a plurality of driving means of predetermined fixed speed ratio operable between the engine and vehicle to provide a relatively slow speed ratio drive and a pair of relatively different speed ratio drives each faster than said relatively slow drive, and change speed means operable in response to operation of said throttle valve actuator beyond its said range of movement for effecting change in the drive through said transmission means from the faster of said pair of drives to another of said drives, said transmission means including a control device automatically operating to provide the relatively slow speed ratio drive in response to release of either the faster or the slower of said pair of drives and adapted to automatically release this relatively slow speed ratio drive in response to operation of either the faster or the slower of said pair of drives, and means yieldingly acting to restore said throttle valve actuator from said position thereof beyond said range of movement to a position within said range of movement, said change speed means operating in response to restoration of said throttle valve actuator as aforesaid for restoring operation of the faster of said pair of drives.

54. In a drive for a motor vehicle having an engine provided with a throttle valve actuator operable by the driver throughout a range of movement in adjusting the throttle valve between its extreme limits of opening and closing positions, means accommodating driver operation of said actuator throughout its said range of movement and therebeyond, transmission means having a plurality of driving means of predetermined fixed speed ratio operable between the engine and vehicle to provide a relatively slow speed ratio drive and a pair of relatively different speed ratio drives each faster than said relatively slow drive, and change speed means operable in response to operation of said throttle valve actuator beyond its said range of movement for effecting change in the drive through said transmission means from the faster of said pair of drives to the slower of said pair of drives, said transmission means including a control device automatically operating to provide the relatively slow speed ratio drive in response to release of either the faster or the slower of said pair of drives and adapted to automatically release this relatively slow speed ratio drive in response to operation of either the faster or the slower of said pair of drives.

55. In a drive for a motor vehicle having an engine provided with a throttle valve actuator operable by the driver throughout a range of movement in adjusting the throttle valve between its extreme limits of opening and closing positions, means accommodating driver operation of said actuator throughout its said range of movement and therebeyond, transmission means having a plurality of driving means of predetermined fixed speed ratio operable between the engine and vehicle to provide a relatively slow speed ratio drive and a pair of relatively different speed ratio drives each faster than said relatively slow speed drive, change speed means operable in response to operation of said throttle valve actuator beyond its said range of movement for effecting change in the drive through said transmission means from the faster of said pair of drives to another of said drives, and means effecting operation and release of said relatively slow speed drive and the slower of said pair of drives independently of operation of said change speed means, the said means for effecting operation and release of said relatively slow speed drive comprising an overrunning control device operably associated therewith and adapted to automatically release this drive in response to operation of the slower of said pair of drives.

56. In a drive for a motor vehicle having an engine provided with a throttle actuator operable by the driver throughout a range of movement in adjusting the throttle between its limits of opening and closing positions, means accommodating driver operation of said actuator from its throttle closing position to the limit of its throttle opening position and therebeyond, transmission mechanism operable to provide at least three forward drives of relatively different predetermined fixed speed ratio from the engine to the vehicle, pressure fluid operated means for controlling at least the fastest of said drives, operating means for controlling at least one of the other of said three drives independently of the pressure fluid, means operable in response to operation of said throttle actuator beyond the limit of its said throttle opening position for effecting control of the operation of said pressure fluid operated means to step-down the speed ratio drive, said step-down control means being so arranged as not to change the transmission drive in either of the other two of said three drives, means operable to effect operation and release of said other two drives independently of operation of said step-down control means as aforesaid, and a fluid coupling between the engine and transmission mechanism for transmitting the drive therebetween, said fluid coupling providing a slip drive between the engine and transmission mechanism thereby facilitating acceleration of the vehicle by allowing the engine to race ahead of the vehicle and operate at a relatively favorable torque output, said fastest of said three drives constituting the normal speed ratio drive of the vehicle for both relatively slow city driving and relatively fast country driving.

57. In a power transmission for driving a motor vehicle having an engine provided with a throttle valve; an eccelerator pedal adapted to be depressed by the vehicle driver; means operably connecting the accelerator pedal with the engine throttle valve accommodating depressed overtravel of the pedal beyond its wide-open throttle position; a driving shaft adapted to be driven by the engine; a driven shaft adapted to drive the vehicle; change speed mechanism including means for driving the driven shaft from the driving shaft at a relatively slow speed and means for driving the driven shaft from the driving shaft at a speed relatively faster than that provided by said relatively slow speed driving means; said relatively fast speed driving means including a frictionally engageable control element operably associated therewith; pressure fluid operated means for effecting operation of said relatively fast driving means, said pressure fluid operated means including a drive control member operable by the pressure fluid to frictionally engage said control element during drive of the vehicle in said relatively slow speed drive to effect said relatively fast drive; fluid pumping means for delivering pressure fluid to operate said drive control member; means for driving said fluid pumping means independently of the engine so that in stopping the vehicle with the engine running the pressure of the fluid will drop below that required to operate said fluid operated means; control means for said relatively slow speed driving means operating to effect this drive independently of said fluid pumping means for starting the vehicle, said control means operating to release the relatively slow speed drive in response to operation of the relatively fast speed drive to accommodate a step-up in the drive through said change speed mechanism when said fluid pumping means operates to restore the pressure of the fluid after the vehicle is started; and means operable in response to said depressed overtravel of the accelerator pedal when the vehicle is being driven in said relatively fast drive for effecting release of said control element by said control member thereby causing a step-down to take place in the drive from said relatively fast drive.

58. In a power transmission for driving a motor vehicle having an engine provided with a throttle valve; an accelerator pedal adapted to be depressed by the vehicle driver; means operably connecting the accelerator pedal with the engine throttle valve accommodating depressed overtravel of the pedal beyond its wide-open throttle position; a driving shaft adapted to be driven by the engine; a driven shaft adapted to drive the vehicle; change speed mechanism including means for driving the driven shaft from the driving shaft at a relatively slow speed, means for driving the driven shaft from the driving shaft at an intermediate speed which is relatively faster than that provided by said slow speed driving means, and means for driving the driven shaft from the driving shaft at a fast speed which is relatively faster than that provided by said slow speed driving means and by the first said fast speed driving means; pressure fluid operated drive control means for effecting operation of one of said fast speed driving means; fluid pumping means for delivering pressure fluid to said fluid operated means; means for driving said fluid pumping means such that in stopping the vehicle with the engine running the pressure of the fluid will drop below that required to operate said fluid operated means; drive control means operable to effect operation of the other of said fast speed driving means; drive control means for said slow speed driving means operating to effect this drive independently of said fluid pumping means for accelerating the vehicle from a position of rest, said slow speed drive control means operating to release the slow speed drive in response to operation of one of the aforesaid drive control means to accommodate a step-up in the drive through said change speed mechanism when said fluid pumping means operates to restore the pressure of the fluid during acceleration of the vehicle from rest as aforesaid; and means operable in response to said depressed overtravel of the accelerator pedal for rendering said pressure fluid operated drive control means inoperative thereby effecting a step-down in the drive through the change speed mechanism.

59. In a power transmission for driving a motor vehicle having an engine provided with a throttle valve actuator operable by the driver; transmission means having a plurality of driving means of predetermined fixed speed ratio operable between the engine and vehicle to provide a relatively slow speed ratio drive and a pair of relatively different speed ratio drives each faster than said relatively slow drive; said relatively slow speed driving means comprising means automatically operating to release this drive in response to operation of one of said pair of drives and to automatically render the relatively slow speed drive operative in response to release of said pair of drives when the vehicle is brought to rest; said driving means for providing the slower of said pair of drives comprising means automatically operating to render this drive operative during predetermined drive of the vehicle in said relatively slow drive and to release the slower of said pair of drives in response to operation of the faster of said pair of drives and in response to bringing the vehicle to rest; said driving means for providing the faster of said pair of drives comprising means automatically operating to render this drive operative in response to the driver releasing said throttle valve actuator subsequently to predetermined drive of the vehicle in the slower of said pair of drives and to release the faster of said pair of drives in response to bringing the vehicle to rest.

60. In a power transmission according to claim 59; transmission control means selectively operable by the vehicle driver to set said transmission in neutral or in another setting for driving the vehicle automatically from rest progressively through the three mentioned drives.

61. In a drive for a motor vehicle having an engine provided with a throttle valve actuator operable by the driver throughout a range of movement in adjusting the throttle valve between its extreme limits of opening and closing positions; means accommodating driver operation of said actuator throughout its said range of movement and therebeyond; transmission means having a plurality of driving means of predetermined fixed speed ratio operable between the engine and vehicle to provide a relatively slow speed ratio drive and a pair of relatively different speed ratio drives each faster than said relatively slow drive; said relatively slow speed driving means comprising means automatically operating to release this drive in response to operation of one of said pair of drives and to automatically render the relatively slow speed drive operative in response to release of said pair of drives when the vehicle is brought to rest; said driving means for providing the slower of said pair of drives comprising means automatically operating to render this drive operative during predetermined drive of the vehicle in said relatively slow drive while said actuator is operated beyond its said range of movement and to release the slower of said pair of drives in response to operation of the faster of said pairs of drives and in response to bringing the vehicle to rest; said driving means for providing the faster of said pair of drives comprising means automatically operating to render this drive operative in response to restoring said throttle valve actuator to its said range of movement subsequently to predetermined drive of the vehicle in the slower of said pair of drives and to release the faster of said pair of drives in response to bringing the vehicle to rest.

62. In a drive for a motor vehicle having an engine and a tailshaft adapted to transmit drive from the engine to the vehicle, change speed mechanism comprising means operable to drive the tailshaft from the engine at a plurality of relatively different speed ratios so as to drive the vehicle in a relatively slow speed drive and at least two other drives each of relatively faster speed than that provided by said slow speed driving means; a fluid coupling cooperably associated with the engine and change speed mechanism, a selector element mounted for preselective manipulation by the vehicle driver to positions for respectively controlling operation of each of said faster drives or to another position for establishing a neutral driving relationship from the engine to the tail shaft, control means for said relatively slow drive operating when the vehicle is at rest and when said selector element is at either of said positions of controlling said faster drives to provide drive relationship from the engine of the tailshaft in said slow speed such that the vehicle may be accelerated from a position of rest, said fluid coupling acting to provide fluid slip between the engine and tailshaft such that with the vehicle at rest and with said selector element at either of its said positions of controlling said faster drives the engine may idle, control means for said relatively faster drives operating in response to accelerating the vehicle from rest to effect operation of, and to limit step-up in the speed ratio drives of said change speed mechanism to, that one of said faster drives which corresponds to the preselective positioning of said selector element and to release this one drive in bringing the vehicle to rest without altering the preselective setting of said selector element, means operating in response to driver manipulation of said selector element to said neutral position for effecting disconnection in the drive between the engine and tailshaft such that with the vehicle at rest the engine may be speeded up above its idling speed without inducing drive of the vehicle in any of said speed ratios, said control means for said relatively slow drive operating to establish said slow drive in bringing the vehicle to rest from a condition of drive in either of said faster drives such that said selector element may be left in either of its said positions of controlling said faster drives and the vehicle operated in successive cycles of firstly, initially accelerating the vehicle from rest in said slow drive with automatic step-up in the drive speed ratio either by single step-up to the slower of said faster drives or by multiple step-up comprising the slower and the faster of said faster drives and secondly, bringing the vehicle to rest with the engine idling by accommodation of said fluid coupling.

63. In a drive for a motor vehicle having an engine and a tailshaft adapted to transmit drive from the engine to the vehicle, change speed mechanism comprising means operable to drive the tailshaft from the engine at a plurality of relatively different speed ratios so as to drive the vehicle in a relatively slow speed drive and at least two other drives each of relatively faster speed than that provided by said slow speed driving means, a fluid coupling cooperably associated with the engine and change speed mechanism, a selector element mounted for preselective manipulation by the vehicle driver to positions for respectively controlling operation of each of said faster drives or to another position for establishing a neutral driving relationship from the engine to the tailshaft, said fluid coupling acting to provide fluid slip between the engine and tailshaft such that with the vehicle at rest and with said selector element at either of its said positions of controlling said faster drives the engine may idle, pressure fluid control means for said relatively faster drives operating in response to accelerating the vehicle from rest to effect operation of, and to limit step-up in the speed ratio drives of said change speed mechanism to, that one of said faster drives which corresponds to the preselective positioning of said selector element and to release this one drive in bringing the vehicle to rest without altering the preselective setting of said selector element, said pressure fluid operating means including a source of fluid and a pump adapted to be driven independently of the engine at a constant speed ratio with respect to the speed of travel of the vehicle, control means for said relatively slow drive operating independently of said pump when the vehicle is at rest and when said selector element is at either of said positions of controlling said faster drives to provide drive relationship from the engine to the tailshaft in said slow speed such that the vehicle may be accelerated from a position of rest, means operating in response to driver manipulation of said selector element to said neutral position for effecting disconnection in the drive between the engine and tailshaft such that with the vehicle at rest the engine may be speeded up above its idling speed without inducing drive of the vehicle in any of said speed ratios, said control means for said relatively slow drive operating to establish said slow drive in bringing the vehicle to rest from a condition of drive in either of said faster drives such that said selector element may be left in either of its said positions of controlling said faster drives and the vehicle operated in successive cycles of firstly, initially accelerating the vehicle from rest in said slow drive with automatic step-up in the drive speed ratio either by single step-up to the slower of said faster drives or by multiple step-up comprising the slower and the faster of said faster drives and secondly, bringing the vehicle to rest with the engine idling by accommodation of said fluid coupling.

64. In a drive for a motor vehicle having an engine and a tailshaft adapted to transmit drive from the engine to the vehicle, change speed mechanism comprising means operable to drive the tailshaft from the engine at a plurality of relatively different speed ratios so as to drive the vehicle in a relatively slow speed drive and at least two other drives each of relatively faster speed than that provided by said slow speed driving means, a fluid coupling cooperably associated with the engine and change speed mechanism, a selector element mounted for preselective manipulation by the vehicle driver to positions for respectively controlling operation of each of said faster drives, control means for said relatively slow drive operating when the vehicle is at rest and when said selector element is at either of said positions of controlling said faster drives to provide drive relationship from the engine to the tailshaft in said slow speed such that the vehicle may be accelerated from a position of rest, said fluid coupling acting to provide fluid slip between the engine and tailshaft such that with the vehicle at rest and with said selector element at either of its said positions of controlling said faster drives the engine may idle, control means for said relatively faster drives operating in response to accelerating the vehicle from rest to effect operation of, and to limit step-up in the speed ratio drives of said change speed mechanism to, that one of said faster drives which corresponds to the preselective positioning of said selector element and to release this one drive in bringing the vehicle to rest without altering the preselective setting of said selector element, said control means for said relatively slow drive operating to establish said slow drive in bringing the vehicle to rest from a condition of drive in either of said faster drives such that said selector element may be left in either of its said positions of controlling said faster drives and the vehicle operated in successive cycles of firstly, initially accelerating the vehicle from rest in said slow drive with automatic step-up in the drive speed ratio either by single step-up to the slower of said faster drives or by multiple step-up comprising the slower and the faster of said faster drives and secondly, bringing the vehicle to rest with the engine idling by accommodation of said fluid coupling.

65. In a drive for a motor vehicle having an engine and a tailshaft adapted to transmit drive from the engine to the vehicle, change speed mechanism comprising means operable to drive the tailshaft from the engine at a plurality of relatively different speed ratios so as to drive the vehicle in a relatively slow speed drive and at least two other drives each of relatively faster speed than that provided by said slow speed driving means, a fluid coupling cooperably associated with the engine and change speed mechanism, a selector element mounted for preselective manipulation by the vehicle driver to positions for respectively controlling operation of each of said faster drives or to another position for establishing a neutral driving relationship from the engine to the tailshaft, control means for said relatively slow drive operating when the vehicle is at rest and when said selector element is at either of said positions of controlling said faster drives to provide drive relationship from the engine to the tailshaft in said slow speed such that the vehicle may be accelerated from a position of rest, said fluid coupling acting to provide fluid slip between the engine and tailshaft such that with the vehicle at rest and with said selector element at either of its said positions of controlling said faster drives the engine may idle, control means for the slower of said relatively faster drives operating during acceleration of the vehicle from rest in said slow drive to effect operation of the slower of said faster drives when said selector element has been preselectively positioned for operation of this drive and to release this drive in bringing the vehicle to rest without altering this preselective position of said selector element, control means for the faster of said relatively faster drives operating during acceleration of the vehicle to effect operation of the faster of said faster drives when the selector element has been preselectively positioned for operation of this drive and to release this drive in bringing the vehicle to rest without altering this preselective position of said selector element, means operating in response to driver manipulation of said selector element to said neutral position for effecting disconnection in the drive between the engine and tailshaft such that with the vehicle at rest the engine may be speeded up above its idling speed without inducing drive of the vehicle in any of said speed ratios, said control means for said relatively slow drive operating to establish said slow drive in bringing the vehicle to rest from a condition of drive in either of said faster drives such that said selector element may be left in either of its said positions of controlling said faster drives and the vehicle operated in either of two cycles, one of said cycles of vehicle operation comprising initially accelerating the vehicle from rest in said slow drive with automatic step-up during vehicle drive to the slower of said faster drives and bringing the vehicle to rest with the engine idling by accommodation of said fluid coupling, the other of said cycles of vehicle operation comprising initially accelerating the vehicle from rest in said slow drive with automatic multiple step-up during vehicle drive to the faster of said faster drives and bringing the vehicle to rest with the engine idling by accommodation of said fluid coupling.

66. In a drive for a motor vehicle having an engine provided with a throttle valve actuator operable by the driver throughout a range of movement in adjusting the throttle valve between its extreme limits of opening and closing positions, means accommodating driver operation of said actuator throughout its said range of movement and therebeyond, transmission means having a plurality of driving means of predetermined fixed speed ratio operable between the engine and vehicle to provide a relatively slow speed ratio drive and a pair of relatively different speed ratio drives each faster than said relatively slow drive, and change speed means operable in response to operation of said throttle valve actuator beyond its said range of movement for effecting change in the drive through said transmission means from the faster of said pair of drives to another of said drives, said transmission means including a control device automatically operating to provide the relatively slow speed ratio drive in response to release of the slower of said pair of drives and adapted to automatically release this relatively slow speed ratio drive in response to operation of one of said pair of drives.

67. In a drive for a motor vehicle having an engine provided with a throttle valve actuator operable by the driver throughout a range of movement in adjusting the throttle valve between its extreme limits of opening and closing positions, means accommodating driver operation of said actuator throughout its said range of movement and therebeyond, transmission means having a plurality of driving means of predetermined fixed speed ratio operable between the engine and vehicle to provide a relatively slow speed ratio drive and a pair of relatively different speed ratio drives each faster than said relatively slow drive, change speed means operable in response to operation of said throttle valve actuator beyond its said range of movement for effecting change in the drive through said transmission means from the faster of said pair of drives to another of said drives, said transmission means including a control device automatically operating to provide the relatively slow speed ratio drive in response to release of the slower of said pair of drives and adapted to automatically release this relatively slow speed ratio drive in response to operation of one of said pair of drives, and means yieldingly acting to restore said throttle valve actuator from said position thereof beyond said range of movement to a position within said range of movement, said change speed means operating in response to restoration of said throttle valve actuator as aforesaid for restoring operation of the faster of said pair of drives.

CARL A. NERACHER.
WILLIAM T. DUNN.
AUGUSTIN J. SYROVY.
TENO IAVELLI.

CERTIFICATE OF CORRECTION.

Patent No. 2,229,336. January 21, 1941.

CARL A. NERACHER, ET AL.

It is hereby certified that error appears in the printed specification of the above numbered patent requiring correction as follows: Page 2, first column, line 25, for the word "thereof" read --thereover--; page 5, first column, line 30, for "161" read --163--; page 10, second column, line 71, for "held" read --hold--; and that the said Letters Patent should be read with this correction therein that the same may conform to the record of the case in the Patent Office.

Signed and sealed this 24th day of June, A. D. 1941.

(Seal)

Henry Van Arsdale,
Acting Commissioner of Patents.